(12) United States Patent
Nakata et al.

(10) Patent No.: US 6,903,816 B2
(45) Date of Patent: Jun. 7, 2005

(54) MIRROR DRIVING MECHANISM, AND SPECTROSCOPE AND SCANNING LASER MICROSCOPE COMPRISING MIRROR WHICH IS DRIVEN BY MIRROR DRIVING MECHANISM

(75) Inventors: Tatsuo Nakata, Hino (JP); Yoshihiro Shimada, Sagamihara (JP); Yasuaki Natori, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 174 days.

(21) Appl. No.: 10/219,807

(22) Filed: Aug. 15, 2002

(65) Prior Publication Data

US 2003/0062484 A1 Apr. 3, 2003

(30) Foreign Application Priority Data

Aug. 21, 2001 (JP) ........................................ 2001-250661

(51) Int. Cl.⁷ .............................................. G01N 21/64
(52) U.S. Cl. ................................. 356/318; 250/458.1
(58) Field of Search ................................. 356/318, 326, 356/328; 250/458.1, 459.1, 461.1, 461.2

(56) References Cited

FOREIGN PATENT DOCUMENTS

| JP | 9-502269 A | 3/1997 |
|---|---|---|
| JP | 2000-056233 A | 2/2000 |

*Primary Examiner*—F. L. Evans
(74) *Attorney, Agent, or Firm*—Frishauf, Holtz, Goodman & Chick, P.C.

(57) ABSTRACT

A mirror driving mechanism comprises a driver configured to drive at least one mirror which reflects a light flux while adjusting a wavelength width and a wavelength band of the light flux separated in a spectrum, and a controller configured to control the driver.

37 Claims, 23 Drawing Sheets

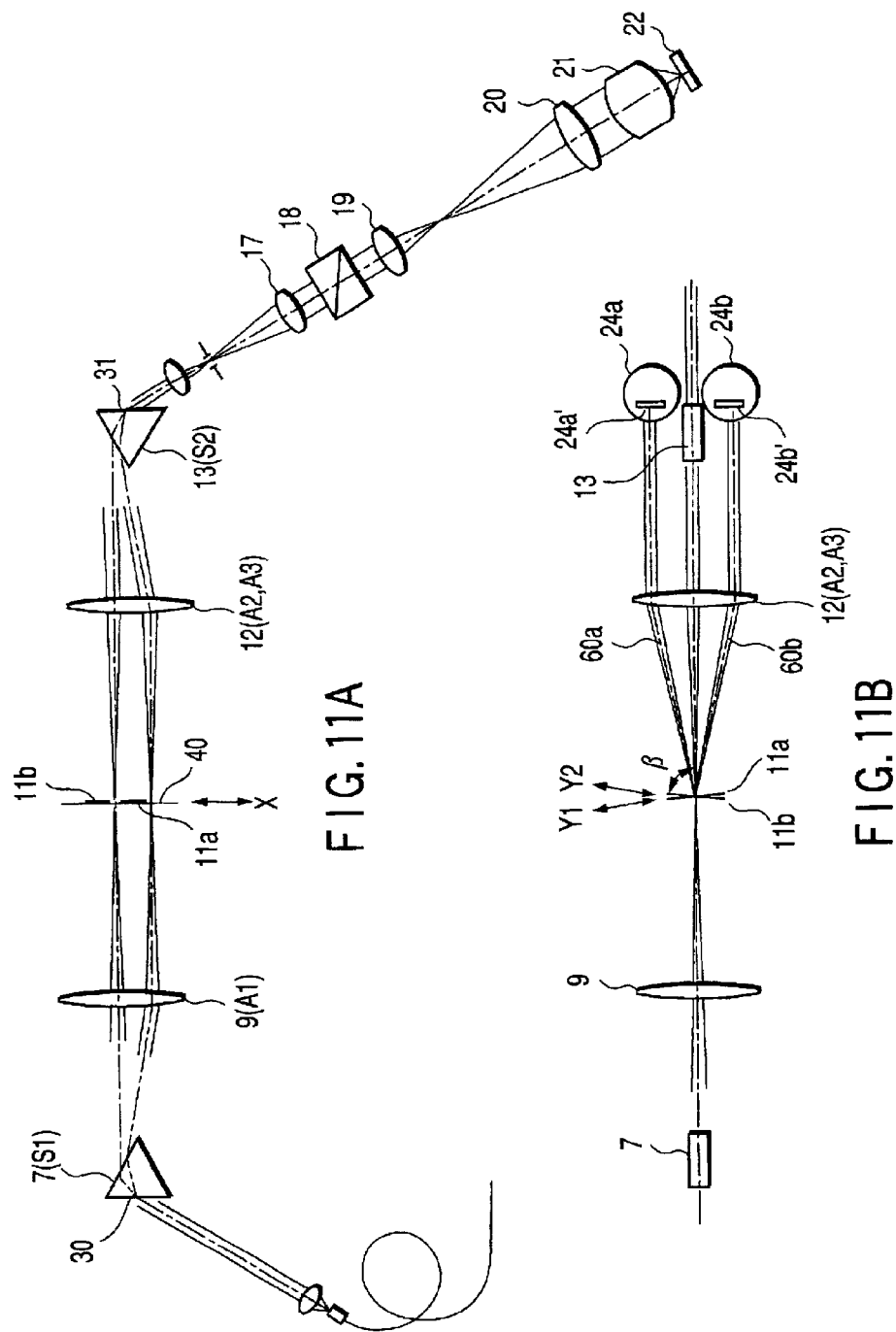

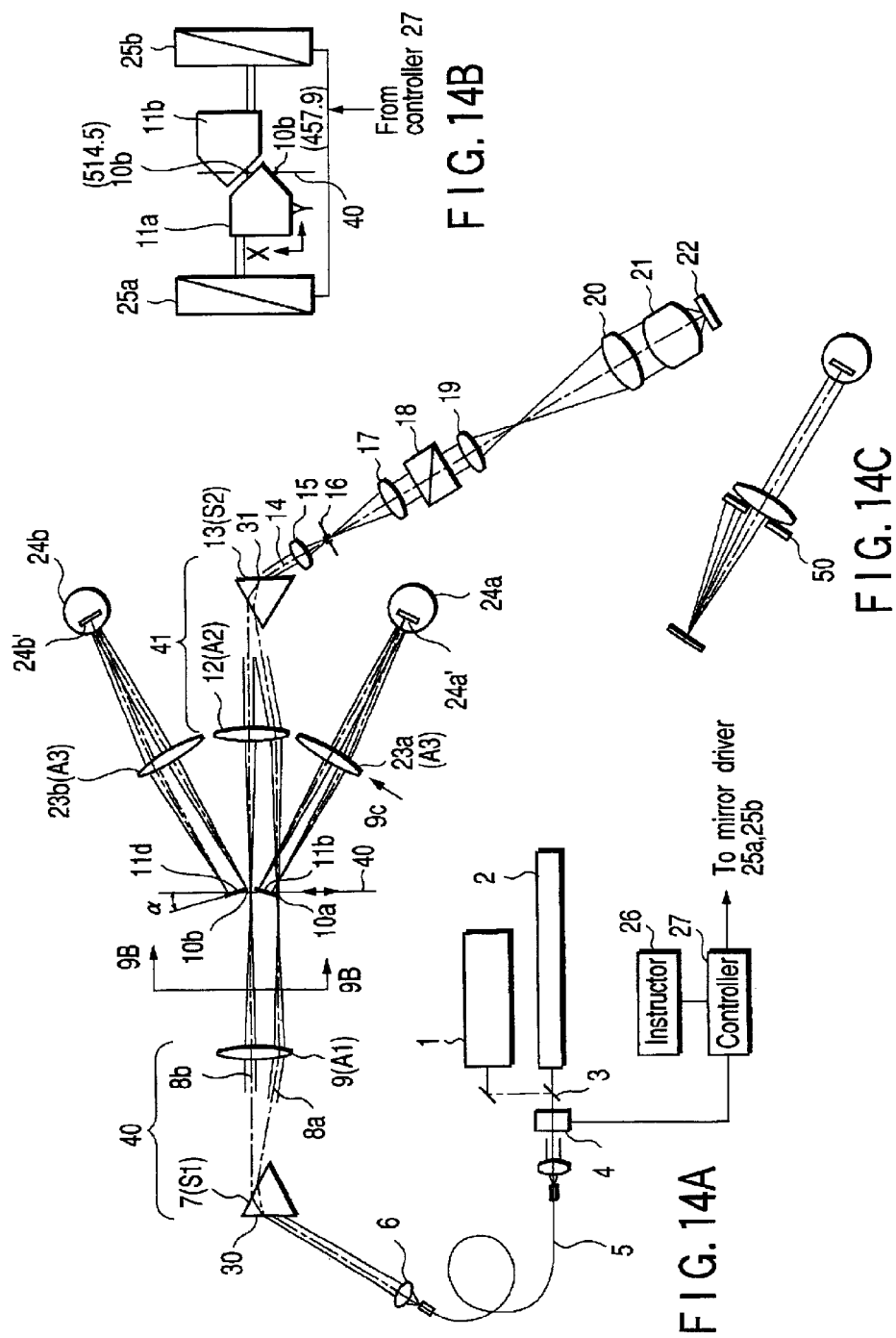

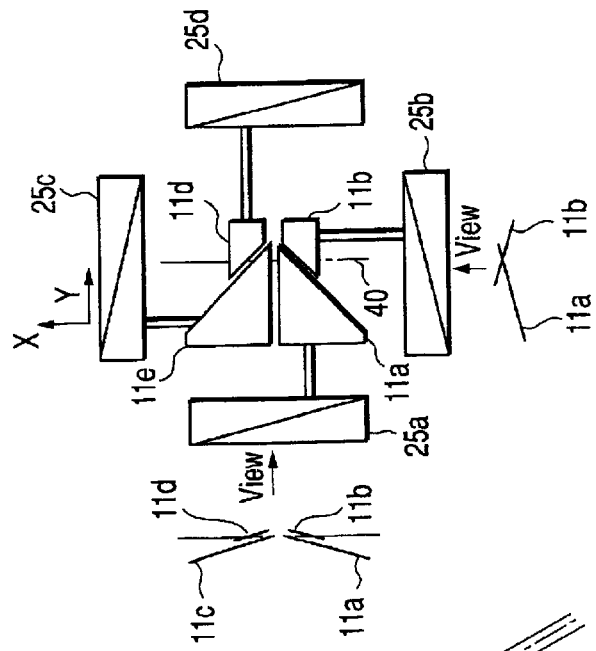
F I G. 16B
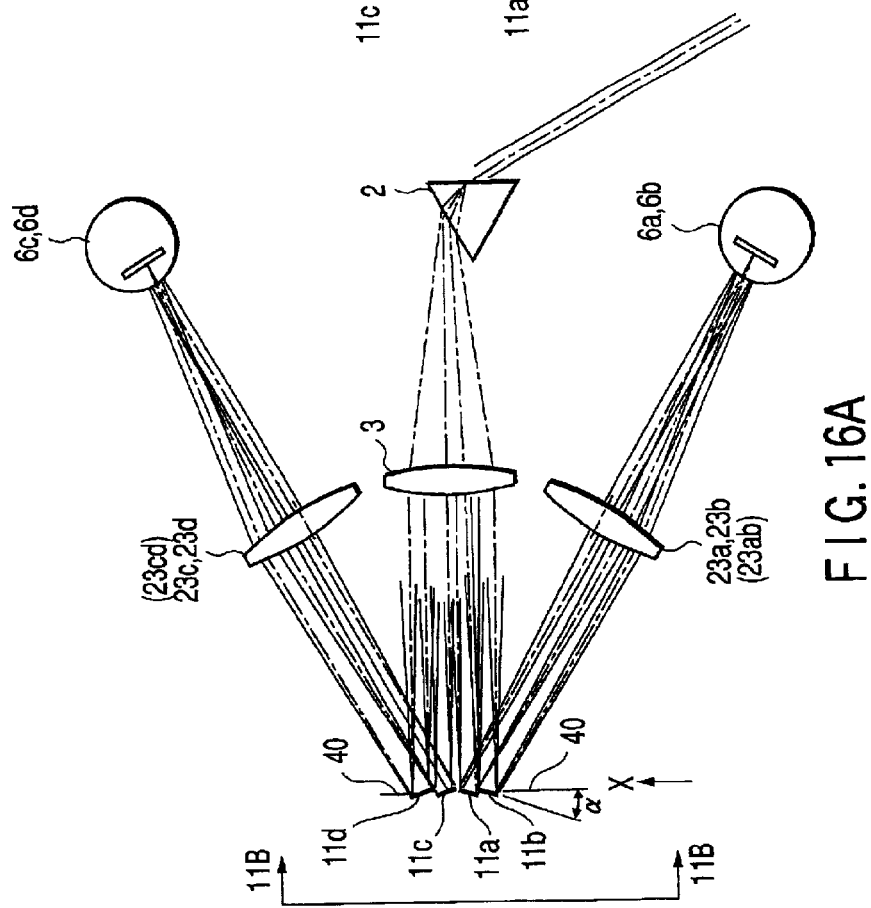
F I G. 16A

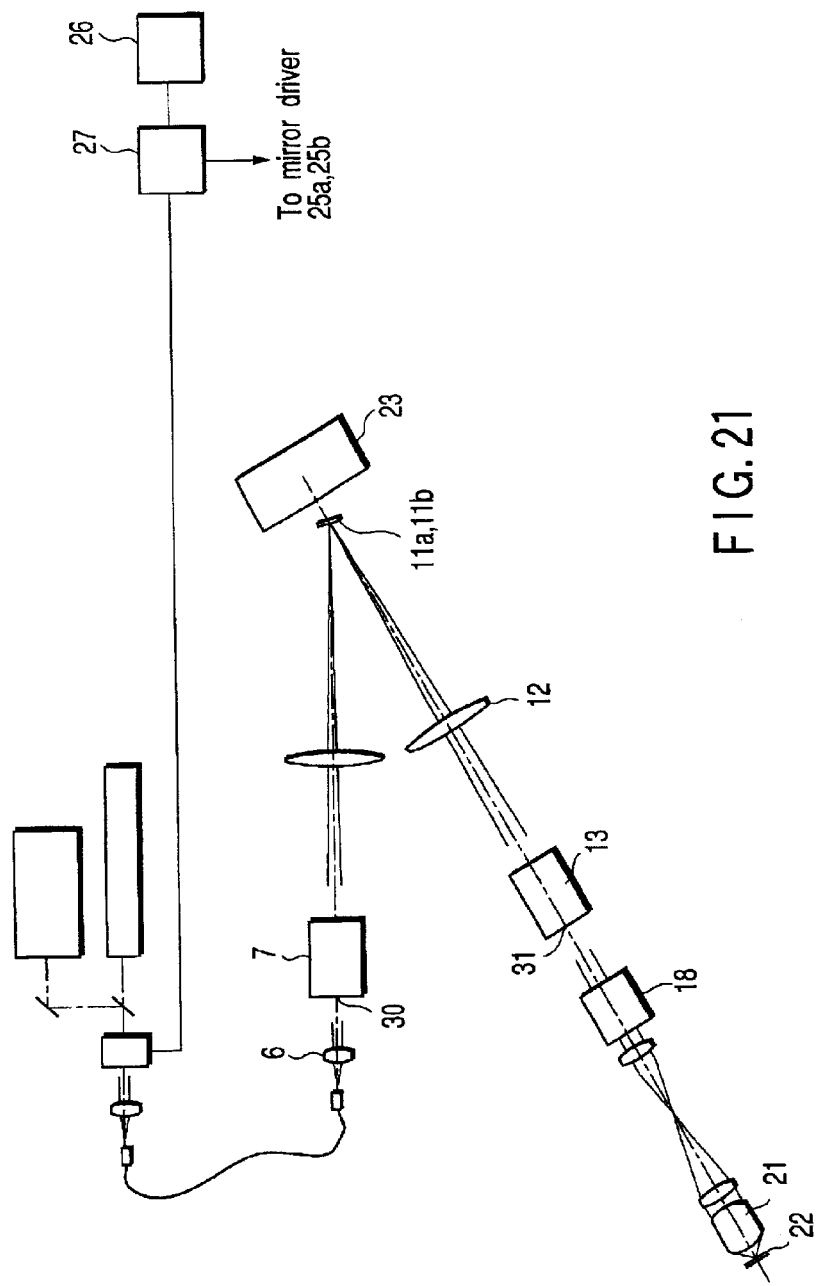
F I G. 21

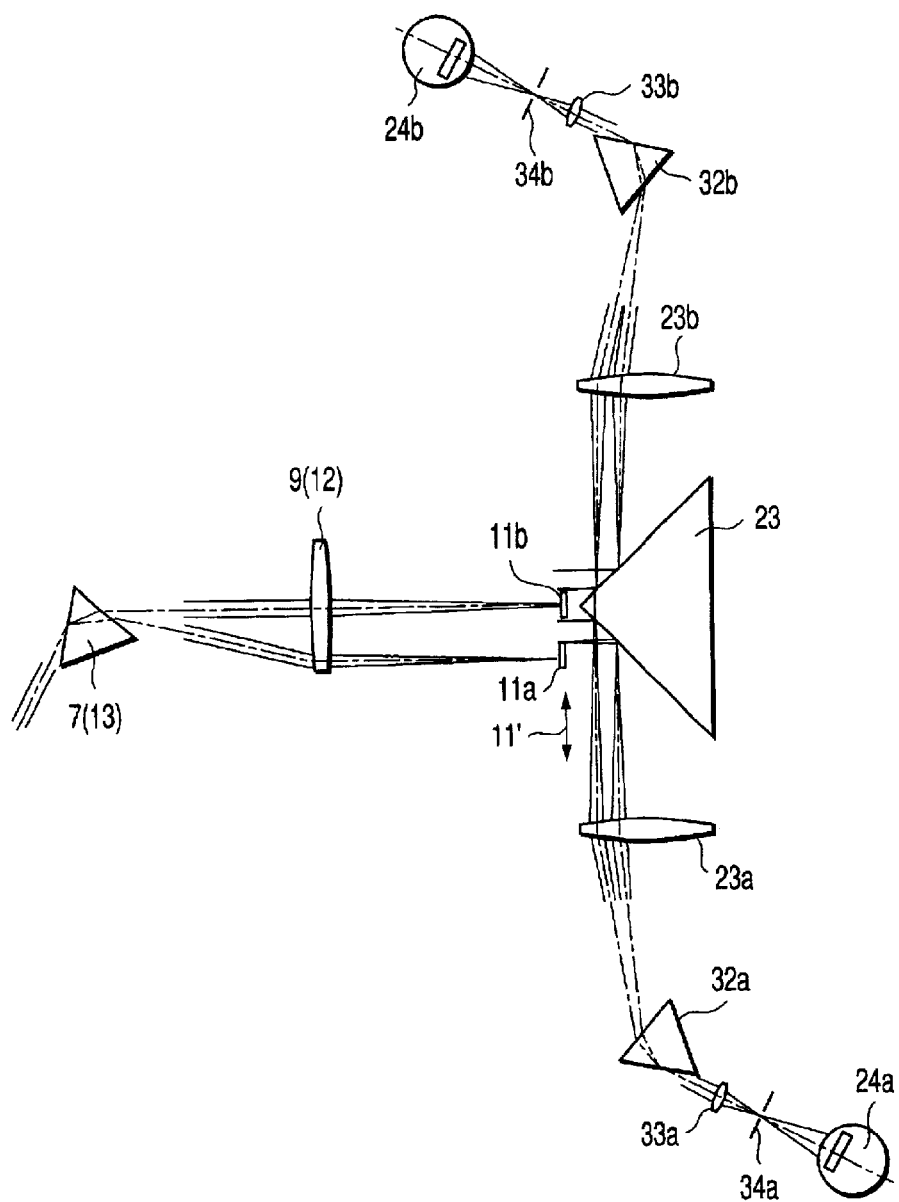
F I G. 22

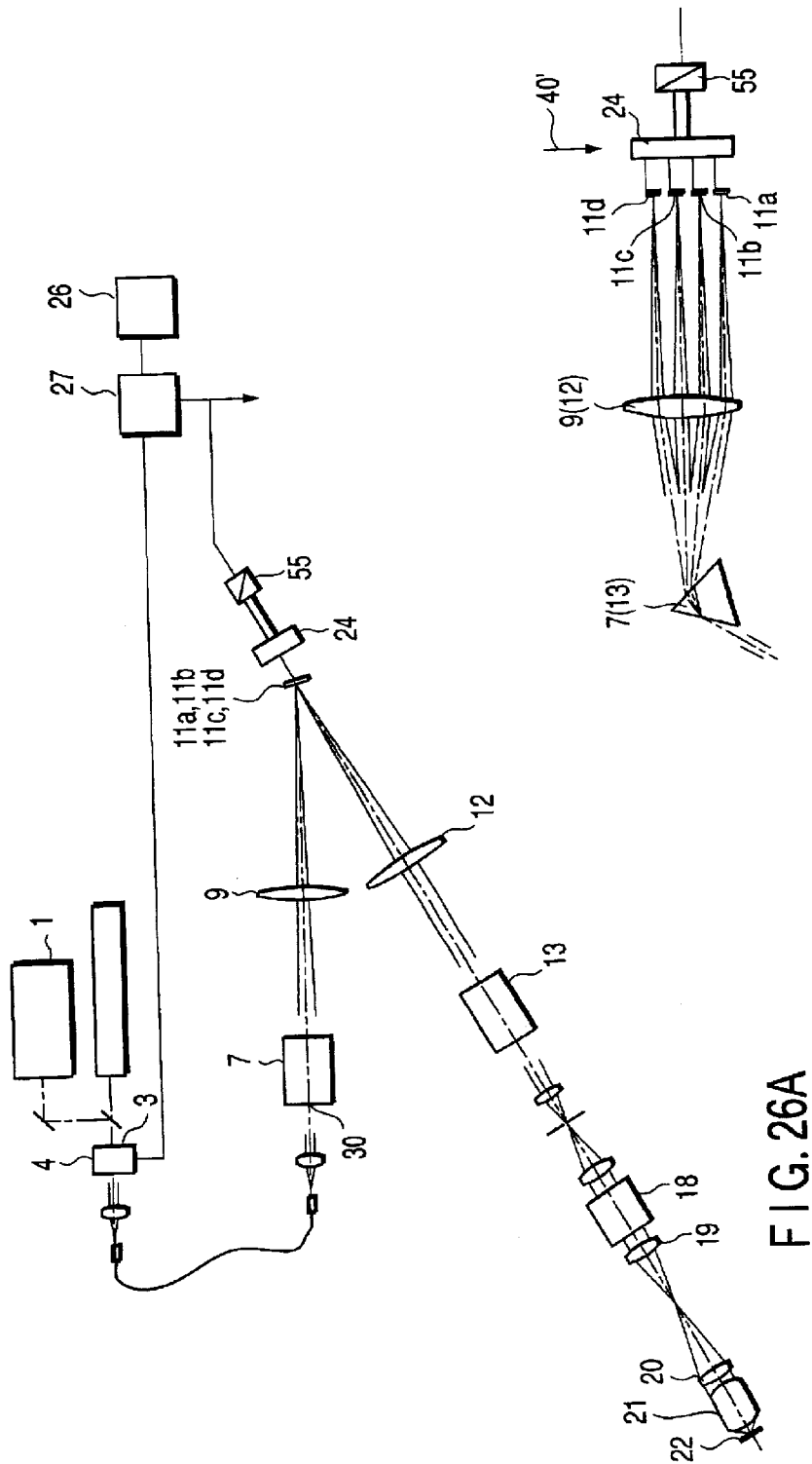
F I G. 26A
F I G. 26B

MIRROR DRIVING MECHANISM, AND SPECTROSCOPE AND SCANNING LASER MICROSCOPE COMPRISING MIRROR WHICH IS DRIVEN BY MIRROR DRIVING MECHANISM

CROSS-REFERENCE TO RELATED APPLICATIONS

This application is based upon and claims the benefit of priority from the prior Japanese Patent Application No. 2001-250661, filed Aug. 21, 2001, the entire contents of which are incorporated herein by reference.

BACKGROUND OF THE INVENTION

1. Field of the Invention

The present invention relates to a driving mechanism of a mirror applied to a scanning laser microscope, and a spectroscope and a scanning laser microscope comprising a mirror which is driven by the driving mechanism.

2. Description of the Related Art

The following device is disclosed in Jpn. Pat. Appln. KOKAI Publication No. 2000-56233. This device comprises at least one dispersive device for separating the irradiated light wavelength and at least one element arranged in the irradiated light wavelength separation part which re-reflects at least one wavelength band as a target in the direction of the microscope irradiation, i.e., at least partially reflects it. As a result, the wavelength or the wavelength band on the irradiation optical path of the microscope, especially the confocal microscope is focused under the adjustment.

FIG. 1 is a figure which shows a configuration of the above-mentioned confocal scanning laser microscope. The light beam output from the fiber F is shaped to the parallel light beam with the lens K, and is incident to the dispersive device DP. The dispersive device DP separates the light beam into light beams with each wavelength included in the laser beam. The light beam separated by the dispersive device DP, for instance, $\lambda 1$, $\lambda 2$, and $\lambda 3$ reaches the element ST. The element ST has small mirrors S1, S2, and S3 arranged at a position where light beams $\lambda 1$, $\lambda 2$, and $\lambda 3$ are condensed, and other parts thereof are transparent.

The irradiation beam is apart from the center of the dispersive device DP and is led to the upper side. Therefore, the each of partial light beams $\lambda 1$, $\lambda 2$, and $\lambda 3$ enters the upper side of the lens L1, travels a little downward from there and are condensed on the small mirrors S1, S2, and S3. The optical path of the light beam reflected with the small mirrors S1, S2, and S3 inclines further downward, and returns below the element DP by passing the lens L1.

The return light beam reflected with the small mirrors S1, S2, and S3, are condensed after passing the dispersive device DP, and pass the lens LS as a light beam with a plurality of wavelengths. And, the condensed light beam is led to the microscope by passing the pinhole PH and reaches the object by passing the microscope objective as shown in FIG. 2.

Fluorescence from the object reaches each middle area of the small mirrors S1, S2, . . . and passes the light-transparent part ST of the small mirrors S1, S2, . . . as shown in FIG. 3. The wedge prisms GK (GK1, GK2, GK3, and GK4, here) are arranged corresponding to each evaluation optical path passing the light-transparent part ST. It becomes possible to limit the wavelength band by being possible to move the wedge prisms GK along two axes. The fluorescence passing the wedge prisms GK is detected with the optical detectors arranged on each evaluation optical path.

As mentioned above, the device described in the Jpn. Pat. Appln. KOKAI Publication No. 2000-56233 is configured as follows based on the scanning confocal laser microscope. That is, this comprises at least one dispersive device for separating the irradiated light wavelength and at least one element arranged in the irradiated light wavelength separation part which re-reflects at least one wavelength band as a target in the direction of the microscope irradiation, i.e., at least partially reflects it, and it can be condensed in a state that the wavelength or the wavelength is adjusted on the irradiation optical path. As a result, an optical filter (dichroic mirror to separate the excitation light beam and fluorescence) for separating the wavelength is not needed. The degree of the freedom becomes high.

However, the beam quality of the laser beam is gradually degraded by passing or reflecting the optical system. The degradation happens one-sidedly, and is not recovered. The diffraction spot broadens since the condense performance in which the objective originally has cannot be obtained when the beam quality degrades. Therefore, both of the in-plane resolution and the confocal effect as the confocal laser microscope degrade. In a word, the performance of the confocal laser microscope greatly depends on especially the optical accuracy on the illumination optical path.

The beam quality degradation of the laser beam is often caused by especially surface accuracy defective of the mirror. The surface accuracy below $\frac{1}{10}\lambda$ is requested for the mirror usually. Since the laser beam is condensed and reflected to the small mirrors S1, S2, . . . , in the Jpn. Pat. Appln. KOKAI Publication No. 2000-56233, higher surface accuracy is requested. In addition, the dust which adheres to the mirror surface affects an important influence on the degradation of the beam quality.

This dust will be considered. There is a possibility that the dust which exists in the natural world and floats in the device adheres to the mirror surface. Additionally, there is also a possibility that the laser beam collects the dust which floats in the device since the effect of an optical trap is caused at the condensed position when the laser beam is condensed. In addition, the fluorescent tenebrescence method is widely used as an application which uses the fluorescent protein in recent years. This technique is a method of not only detecting fluorescence from the sample by irradiating the laser beam to the sample but also positively discoloring the fluorescent materials which is used as the sample to observe the recovery of the fluorescent material. Therefore, stronger laser power is requested compared with a usual fluorescent observation. Therefore, the possibility of the collection of the dust by the above-mentioned optical trap becomes larger.

The laser microscope to observe two-photon fluorescence from the sample attracts especially attention in recent years. The strong laser power with from several mill watts to several tens mill watts is requested to generate two photon fluorescence from the sample. Therefore, the possibility of the collection of the dust by an optical trap extremely becomes large in this laser microscope.

To satisfy the above-mentioned application by the configuration according to the Jpn. Pat. Appln. KOKAI Publication No. 2000-56233 and provide the device to observe two-photon fluorescence, it is necessary to exclude the dust in the device with an extremely high level. Therefore, an important influence is affected on the cost on the manufacture.

The configuration according to the Jpn. Pat. Appln. KOKAI Publication No. 2000-56233 has a problem that the freedom degree of the arrangement of an optical detector is low and is limited.

In the configuration according to the Jpn. Pat. Appln. KOKAI Publication No. 2000-56233, the light from the sample reaches each middle area of the small mirrors S1, S2, . . . , and passes the light-transparent part ST of the small mirrors S1, S2, . . . as shown in FIG. 3. The wedge prisms GK (GK1, GK2, GK3, and GK4, here) are arranged corresponding to each evaluation optical path passing the light-transparent part ST. Each light flux is bent by the dispersion with the wedge prisms GK, and, in addition, is condensed by the lens KO.

However, the light flux which does not pass the wedge prisms GK goes toward a direction of an optical detector at the different angle as shown in FIG. 4. Even when the wedge angle of the prism becomes large and the angle difference is about 60 degrees at most. Though the refraction angle becomes large if the wedge angle of the wedge prism is large, the wavelength decomposition accuracy lowers since the distance from the condensed position to an incident position to the wedge prism increases. In a word, the angle difference and the wavelength decomposition accuracy have the conflicting relations.

Therefore, since the layout is limited to especially in a case of using a photo-multiplier of a side on type as an optical detector, it is necessary to keep away the position of an optical detector from the element ST which holds the mirror, and, as a result, the device is enlarged. This is an unavoidable whenever the above-mentioned conventional configuration such that a desired spectrum band is limited by penetrating the light from the sample at the position of the element ST which holds the mirror, and refracting it with the prism.

In addition, the independent confocal diaphragm is not arranged on the separated each optical detection path and it is difficult to be arranged according to the configuration of Jpn. Pat. Appln. KOKAI Publication No. 2000-56233.

Generally, it is ordinary that fluorescence from the sample is slight as the photo-multipliers are needed as an optical detector. Since tenebrescence of a fluorescent sample becomes remarkable when the excited light (laser light) is strong, it is general to try to lower the excited light amount as much as possible within the permissible range while the observer considers the balance of the noise of the tenebrescence of the sample and the obtained image. Therefore, it becomes an extremely important to suppress the loss of the fluorescence as much as possible in this kind of device.

The sample labeled by two fluorescence dyes (DAPI, CY5) is considered.

The DAPI has the absorption wavelength band in the UV band (340 to 365 nm). The peak of the fluorescent wavelength emitted from the DAPI is about 450 nm. On the other hand, the CY5 has the absorption wavelength band in red band (630 to 650 nm), and the peak of the fluorescent wavelength is about 670 nm.

Here, the spot formed by the fluorescence at the image formation position will be described referring to FIG. 2.

When the laser spot is formed with the objective 21 on the sample 22, the fluorescence emitted from here focuses the spot at the image formation position where the confocal diaphragm 16 is arranged, that is, the image formation position by the lens 23 through the objective 21, the image formation lens 20, and the pupil projection lens 19. The spot diameter (diffraction diameter) is shown by the following expression.

$$\phi = 1.22 \times \lambda / NA$$

NA is an opening of the lens 23, and λ is wavelength.

The spot diameter of the CY5 (fluorescent wavelength 670 nm) differs from by the DAPI (fluorescent wavelength 450 nm) about 1.5 times and is larger than that from this expression.

Therefore, to secure the confocal effect, the diameter of the confocal diaphragm 16 is set according to the spot diameter of the DAPI in the above-mentioned conventional technology. This set value becomes optimal for the DAPI. However, since the confocal diaphragm 16 needlessly narrows this set value, the valuable fluorescence is lost. There is a defect that when the diameter of the confocal diaphragm 16 is matched to the CY5, an enough confocal effect cannot be achieved by the DAPI. Thus, since the confocal diaphragm is not arranged on each detection optical path, there is the above-mentioned defect.

At least one wedge prism which disperses the fluorescence in a direction different from the direction where the fluorescence from the sample is dispersed to each detection optical path exists.

Therefore, it is realistically difficult to arrange the confocal diaphragm on the optical paths, respectively. The reason is why it is necessary to re-arrange and move the prism for the light flux to focus it by canceling dispersion in synchronous with the movement of the above-mentioned wedge prism.

In addition, in the above-mentioned conventional configuration, in order to apply to several kinds of laser beams, it is necessary to change and adjust the small mirror to reflect the laser beam.

As mentioned above, the laser beam, that is, the light beam separated into the wavelength included in the laser beam in the dispersive device DP has the small mirrors S1, S2, and S3 in the condensing positions, and other parts thereof reach the element ST which is a transparent mirror holding body. In a word, the small mirror is arranged always, for instance, as the mirror holding glass stick at a position where the laser beam is condensed corresponding to the wavelength.

Since the stick excitation selector (mirror holding body ST with small mirrors S1, S2, S3, . . . ) can be exchanged, the single or a plurality of wavelengths can be arbitrarily configured.

The conventional example, the laser beam which is the excitation light beam is reflected, the small mirrors S1, S2, S3, . . . are provided to lead the light from the sample which contains the fluorescence to the optical detector, and the element ST which is used as the transparent mirror holding body is required as other parts. It is possible to apply to the excitation light beam in single wavelength or a plurality of wavelength bands by the mirror holding body ST. However, it is necessary to exchange the holding body ST or the small mirror in every case for the laser beam from which various combinations are considered. However, since high accuracy is required for the angle of the small mirror and the position of the mirror to the holding body ST in order to reflect and lead the laser beam surely with a small mirror to the microscope, a difficult adjustment to secure accuracy when exchanging is needed.

The conventional configuration has a problem that it is difficult to detect the fluorescence by the best condition. For instance, a case that the ST comprising a small mirror in a spectrum band where the excitation wavelength correspond to 488, 543, and 633 nm is used and the fluorescence of the labeled sample is observed with two fluorescence dyes (FITC, CY5) is considered. The wavelengths of 488 and 633 nm are used for the excitation wavelength. Therefore, the wavelength of 543 nm is not used.

At this time, the fluorescence emitted from the labeled part with the FITC contains the wavelength of 543 nm. However, the light beam of the wavelength of 543 nm cannot be detected as the fluorescence from the sample since it is reflected with the small mirror. Therefore, it is necessary to arrange a lot of small mirrors to correspond to a lot of laser beams by one mirror holding body ST. However, though it becomes possible to apply a lot of laser beams by the above-mentioned method, the fluorescence included in the light from the sample having the same wavelength as the wavelength of the laser beam not used as excitation light beam is always reflected.

Besides the above-mentioned conventional technology, in the International Patent Application KOHYO Publication No. 9-502269, the spectroscope in which the fluorescent light flux is dispersed according to the spectrum decomposition means such as prisms, the first spectrum range is narrowed at one side, on the other hand, the second range by reflecting at least part of the spectrum range where the diaphragm is not passed to configure two optical paths which configures the second spectrum range and the optical detector is provided to each optical path.

The outline configuration of spectroscope 216 of International Patent Application KOHYO Publication No. 9-502269 will be explained referring to FIG. 5. FIG. 5 is a figure which shows the configuration when three optical detectors are provided.

The selection device 225 has the spectrum decomposition means 227 for separating the light flux 214 and means 228 for narrowing the first spectrum range 229 at one side and reflecting at least part 230 of the spectrum range which does not pass the diaphragm on the other hand. The optical detector 226 has the first optical detector 231 arranged on the optical path within the narrowed first spectrum range 229 and the second optical detector 232 arranged on the optical path within the range of the reflected spectrum. The selection device 225 is arranged on the optical path within reflecting range 230 of the spectrum and has means 233 for narrowing the second spectrum range 234. The second optical detector 232 is arranged on the optical path within the narrowed second spectrum range 234. The third optical detector 236 is arranged on the optical path within the further reflected spectrum range 235. Means 238 for narrowing the third spectrum range 237 on the optical path within the reflected spectrum range is arranged. The third optical detector 236 is arranged on the optical path within the narrowed third spectrum range 237.

It becomes possible to select the three spectrum ranges 229, 234, and 237 as a total and perform optical detection as mentioned above.

The configuration of the device comprising three optical detectors is shown above. When the number of detectors is two, the third optical detector 236 has been similarly omitted in that case.

In the configuration of the above-mentioned International Patent Application KOHYO Publication No. 9-502269, the light flux 214 is separated in the spectrum by the spectrum decomposition means 227. The first spectrum range 229 is narrowed in one side, and is divided into the wavelength bands of each of fluorescence with means 228 (changeable slit) which reflects at least part 230 within the spectrum range which does not pass the diaphragm on the other hand reflects. However, since the light flux diameter of light flux 214 has some size, it is not divided into each detection optical path with the enough spectrum resolution. Though the distance of the spectrum decomposition means 227 and reflection means 228 may be taken long to raise the spectrum resolution, since the device becomes large, it is not realistic.

The technology which arranges the condenser lens behind the spectrum decomposition means is known as means to make up for the fault that the spectrum accuracy is limited by the size of the light flux diameter. As a result, the spectrum resolution is improved more than the configurations without the condenser lens shown in FIG. 5, since light flux can be narrowed to the diffraction diameter.

However, the light flux is condensed by the condenser lens, the condensed position cannot be set at the best position for both narrowing means 228 and 233, for instance in FIG. 5. The will be explained to be assumed to set the condensed position in narrowing means 228. In this case, though the spectrum of extremely high accuracy is possible since light flux is narrowed even to the diffraction diameter in narrowing means 228, an optical position of the narrowing means 233 largely shifts from the condensed position. Therefore, since the light flux broadens at this position, the spectrum of high accuracy cannot be achieved.

Therefore, when the same spectrum accuracy is obtained, the condensed position will be set at the middle position of the narrowing means 228 and 233. However, since this position shifts from the condensed position for each means, ideal spectrum accuracy cannot be achieved.

BRIEF SUMMARY OF THE INVENTION

A mirror driving mechanism according to the first aspect of the present invention is characterized by comprising: a driver configured to drive at least one mirror which reflects a light flux while adjusting a wavelength width and a wavelength band of the light flux separated in a spectrum; and a controller configured to control the driver.

A mirror driving mechanism according to the second aspect of the present invention is characterized by comprising: a driver configured to drive a mirror as at least one shielding member to shield a light flux while adjusting a wavelength width and a wavelength band of the light flux separated in a spectrum; and a controller configured to control the driver.

A spectroscope according to the third aspect of the present invention is characterized by comprising: a spectrum decomposition part configured to separate an incident light flux into a desired spectrum; at least one reflector configured to reflect the spectrum while adjusting a wavelength width and a wavelength band of the separated light flux; and at least one detector configured to receive and detect the light flux reflected by the reflector.

A spectroscope according to the fourth aspect of the present invention is characterized by comprising: a spectrum decomposition part configured to separate an incidence light flux into the desired spectrum; at least one shielding part configured to intercept the light flux while adjusting a wavelength width and A wavelength band of the light flux which is separated to the spectrum; and at least one detector which receives the light flux, which is not shielded by the cutoff part and passes it, and detects the light flux.

A scanning laser microscope which scans on a sample with a scanning device through an objective with a laser light beam having at least one spectrum region and narrows a fluorescence from the sample within a desired spectrum range to perform an optical detection, according to the fifth aspect of the present invention is characterized by comprising: a spectrum decomposition part configured to separate the laser light beam having at least one spectrum band into the spectrum; a first optical system configured to condense the laser light beam which is separated to the spectrum; a second optical system configured to condense a light from the sample while collimating the laser light beam; a spectrum synthesis/the decomposition part configured to separate the light from the sample to the spectrum while synthesizing the laser light beam which is separated to the spectrum; at least one reflector arranged substantially at a focus position of the first optical system and the second optical system, and configured to pass the laser light beam having at least one spectrum region and reflect a part of the light from the sample; and an optical detector which detects the light from the sample led by the reflector, respectively.

A scanning laser microscope which scans on a sample with a scanning device through an objective with a laser light beam having at least one spectrum region and narrows a fluorescence from the sample within a desired spectrum range to perform an optical detection, according to the sixth aspect of the present invention is characterized by comprising: a spectrum decomposition part configured to separate the laser light beam having at least one spectrum band into the spectrum; a first optical system configured to condense the laser light beam which is separated to the spectrum; at least one reflector arranged substantially at a focus position of the first optical system, and configured to reflect the laser light beam which is separated to the spectrum at least partially and pass the light from the sample with being able to adjust a wavelength width and a wavelength band; a second optical system configured to substantially condense a light from the sample while collimating the laser light beam reflected with the reflector; and an optical detector which detects the light from the sample which passes the reflector, respectively.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11A and FIG. 11B are figures which show an outline configuration of the scanning laser microscope according to the fourth embodiment;

FIG. 14A to FIG. 14C are figures which show an outline configuration of the scanning laser microscope according to the seventh embodiment;

FIG. 16A and FIG. 16B are figures which show an outline configuration of the scanning laser microscope according to the ninth embodiment;

FIG. 21 is a figure which shows an outline configuration of the scanning laser microscope according to the twelfth embodiment;

FIG. 22 is a figure which shows details of the detection part in the scanning laser microscope according to the twelfth embodiment;

FIG. 26A and FIG. 26B are figures which show an outline configuration of the scanning laser microscope according to the fifteenth embodiment.

DETAILED DESCRIPTION OF THE INVENTION (First Embodiment)

Figures 6A, 6B:
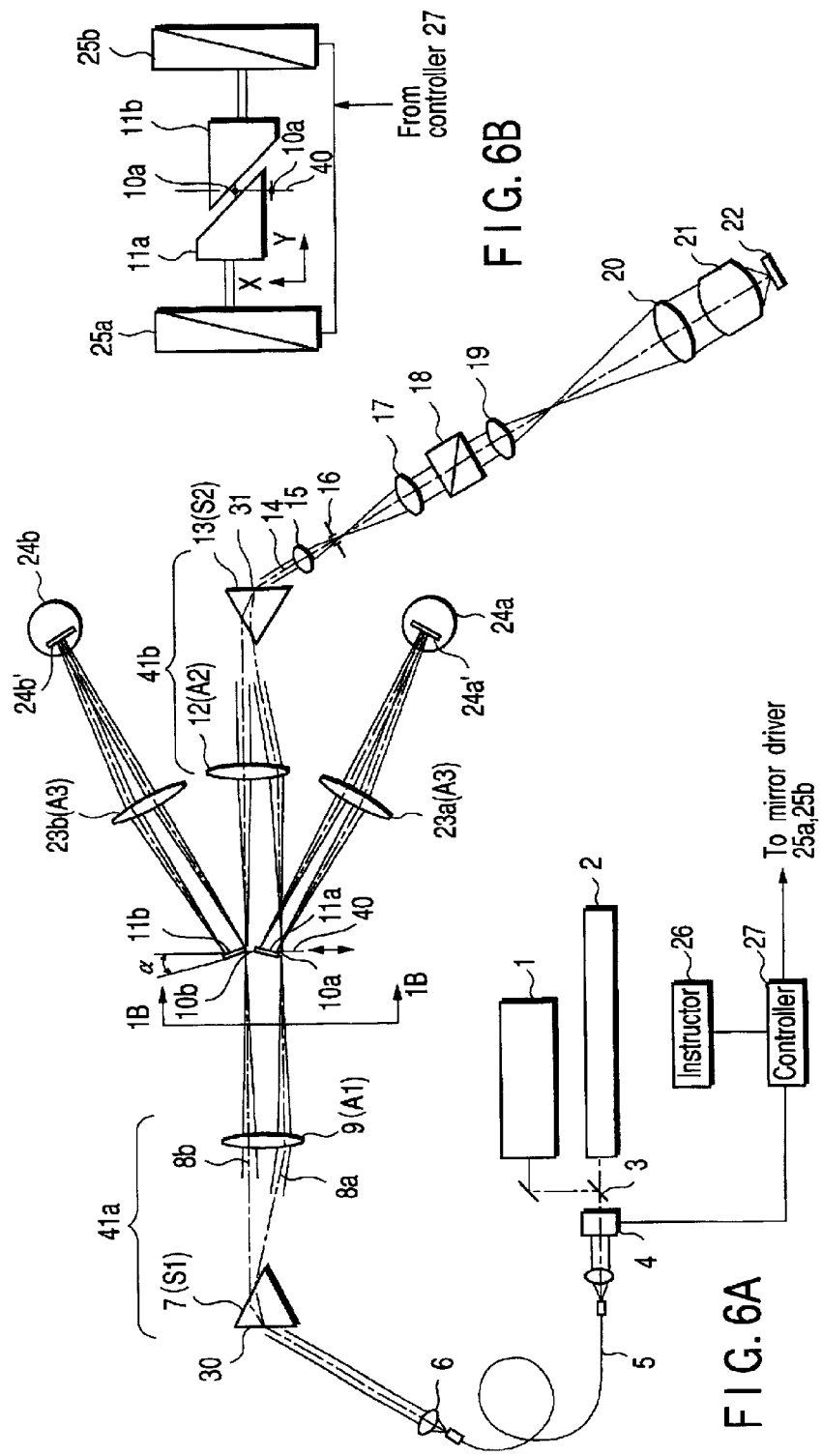
FIG. 6A and FIG. 6B are figures which show an outline configuration of the scanning laser microscope according to the first embodiment of the present invention.

FIG. 6A and FIG. 6B are figures which show an outline configuration of the scanning laser microscope according to the first embodiment of the present invention. FIG. 6A is a general view of the scanning laser microscope according to the first embodiment of the present invention. FIG. 6B is a side view of the triangular mirrors 11a and 11b (view cut along 1B—1B of the FIG. 6A).

The laser light source 1 is an argon laser comprising an oscillation line of multi wavelength. The laser light source 1 has three oscillation lines of 457.9 nm, 488 nm, and 514.5 nm. The laser light source 2 is a helium neon laser, and has the oscillation line of 543 nm. These laser beams are synthesized by the dichroic mirror 3 and is incident to the AOTF 4. The AOTF 4 functions as a select filter to above-mentioned four oscillation lines. Concretely, the AOTF 4 can selectively lead the oscillation line to the optical fiber 5 by applying the RF corresponding to each oscillation line.

The laser beam output from the optical fiber 5 becomes a parallel light beam with the collimator lens 6 and is output to be Incident to the prism 7 (S1). The optical paths of the oscillation lines selected here (457.9 nm and 514.5 nm, here) are bent and output as the laser beams 8a and 8b, respectively. These laser beams are condensed to the focus positions as 10a and 10b, respectively by the condenser lens 9 (A1). The movable triangular mirrors 11a and 11b which are movable in the directions of two axes (direction a vertical direction to the paper and arrow direction of FIG. 6A and FIG. 6B) arranged substantially at the focus position of the condenser lens 9 (A1), are positioned and adjusted to shield the light excluding the laser beam 8a and 8b which pass at the position of 10a and 10b. The laser beam 8a and 8b which have passed the triangular mirrors 11a and 11b are returned to the parallel light beam by the lens 12 (A2), are synthesized in addition with the prism 13 (S2) to become one laser beam 14, and is incident to the lens 15. As for the optical system 40 and the optical system 41, quite the same one is used in symmetry in the embodiment.

After passing the diaphragm 16 arranged at the focus position of the lens 15, the laser beam 14 is incident to the lens 17, becomes the parallel light beam by the lens 17 and is incident to the X-Y scanner 18.

The laser beam output from the X-Y scanner 18 penetrates the pupil projection lens 19 and the image formation lens 20, and is condensed on the sample 22 by the objective 21 to scan the sample 22.

The fluorescence from the sample 22 and the laser beam which is reflected by the sample 22 travels the optical path in the opposite direction. Since the diaphragm 16 is disposed at an optically conjugated position as the sample 22, the diaphragm 16 functions as a confocal diaphragm.

The light beam which passes the diaphragm 16 is made to a parallel light beam with the lens 15, and is separated to the spectrum with the prism 13 (S2). That is, the laser beam which is reflected by the sample 22 returns on the optical path completely in the opposite direction, and is excited by the laser beams of 457.9 nm and 514.5 nm. The fluorescence emitted from the sample is separated in the spectrum by the spectrum characteristic and is condensed to the focus position of the lens 12 (A2) (It is also the focus position of lens 9 (A1)).

The fluorescence can be reflected by the mirrors 11a and 11b which a shape having the vertical angle and is detected by the optical detectors 24a and 24b by passing the lenses 23a and 23b (optical part (A3)), respectively.

The detection parts 24a' and 24b' of the optical detectors 24a and 24b are arranged, respectively, at the optically conjugated position of the incident position 30 to the prism 7 (S1) of the laser light beam and the position 31 where the light from the sample is incident to the prism 13 (S2).

The configuration and the function of the triangular mirrors 11a and 11b will be explained in detail here referring to FIG. 7.

The mirrors 11a and 11b can respectively be moved by the X-Y stages 25a and 25b. By moving the mirror 11a and 11b along the Y direction, it is possible to set the spectrum width of the reflecting light beam directing to the optical detectors 24a and 24b freely. The spectrum band can be freely set by moving the mirrors 11a and 11b along the X direction. The mirrors 11a and 11b are arranged with the elevation only by the α=15 degree for the spectrum condensed line 40 formed respectively as a focus position of lens 9 (A1).

In the above-mentioned example, the position of the mirrors 11a and 11b is set as corresponding to the oscillation line of 457.9 nm and 514.5 nm as a laser beam. It is not limited to this, and the mirror position can be set to an arbitrary combination of two of four oscillation lines or one arbitrary thereof.

When the oscillation line of the laser beam is selected by the fluorescent characteristic of the sample which is the observation object, the command signal is output from the instructor 26 to the controller 27. The controller 27 controls the AOTF 4 and outputs the RF corresponding to the target oscillation line. The controller 27 drives the stages 25a and 25b in addition, and passes a target oscillation line, and controls the position of the mirrors 11a and 11b to detect the maximum fluorescence from the sample. Of course, when the sample is a double stain, and the crosstalk of the fluorescence becomes a problem, the X-Y stage is driven in the Y direction with the instructor 26. It is also possible to limit the spectrum width which reflects aiming at an optical detector or is possible to shift a spectrum band by driving the X-Y stage in the X direction.

Figure 1:
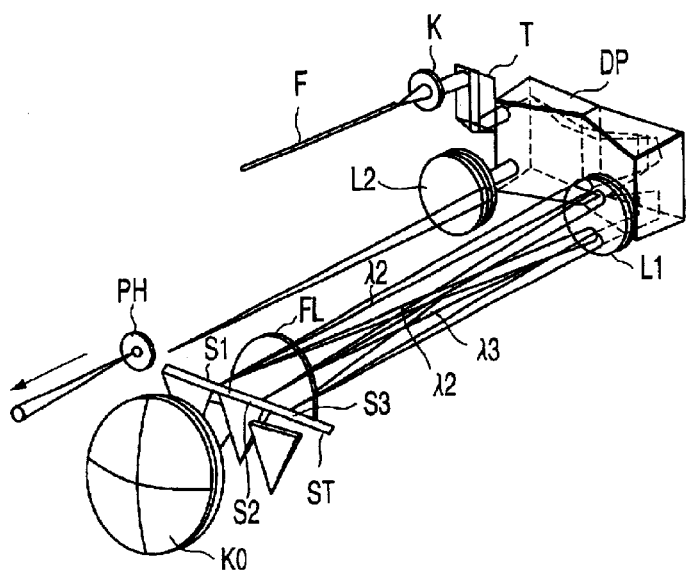
FIG. 1 is a figure which shows a configuration of the conventional confocal scanning laser microscope.
Figure 2:
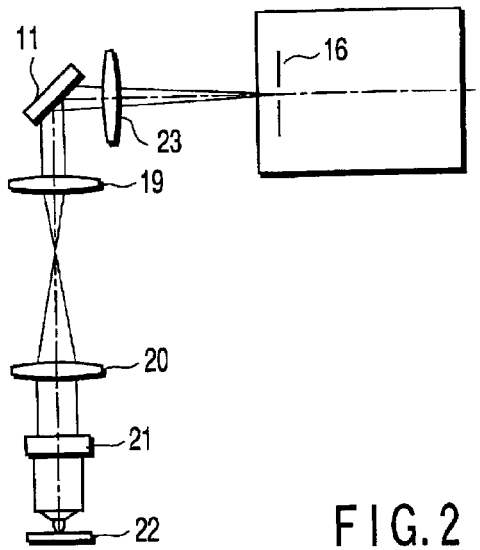
FIG. 2 is a figure to explain a spot formed by the fluorescence at image formation position.
Figure 3:
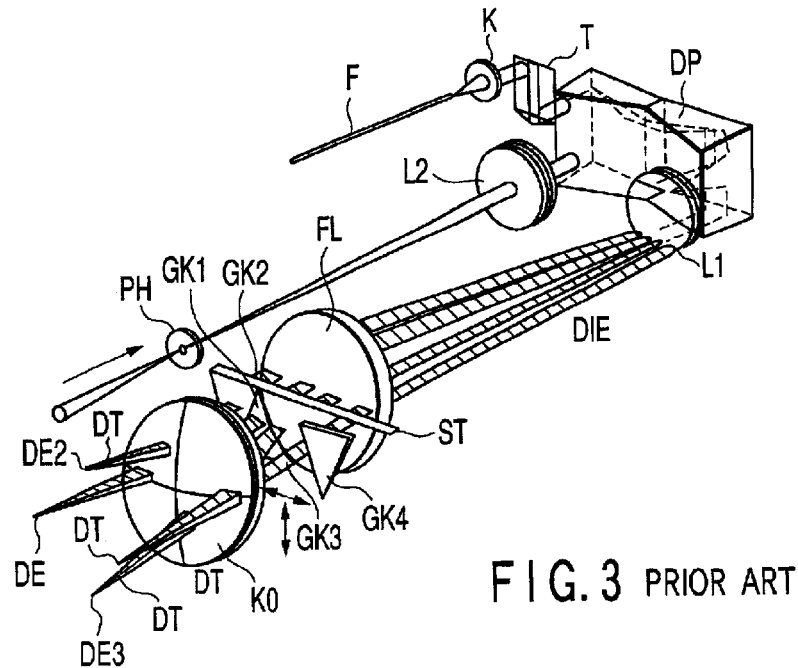
FIG. 3 is a figure which shows a configuration of the conventional confocal scanning laser microscope.
Figure 4:
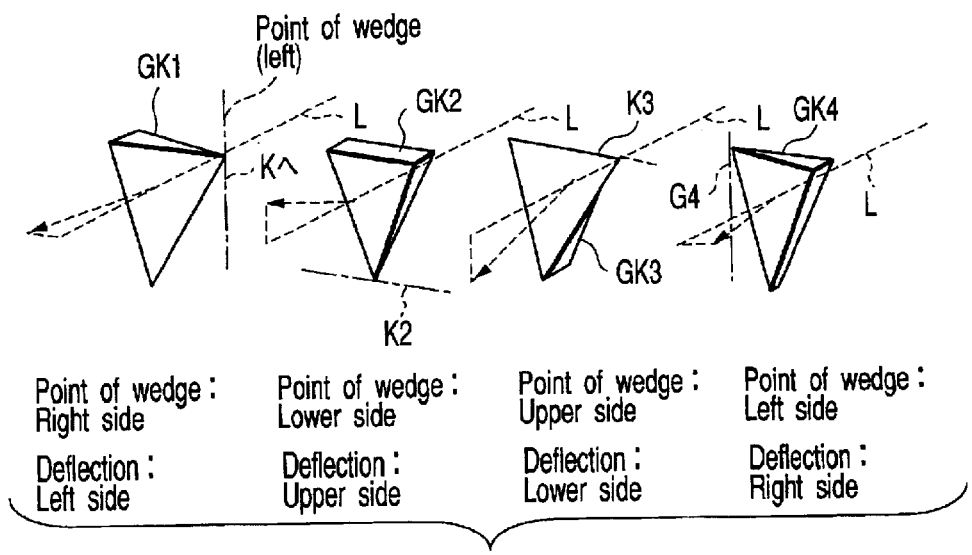
FIG. 4 is a figure to explain the conventional problem.
Figure 7:
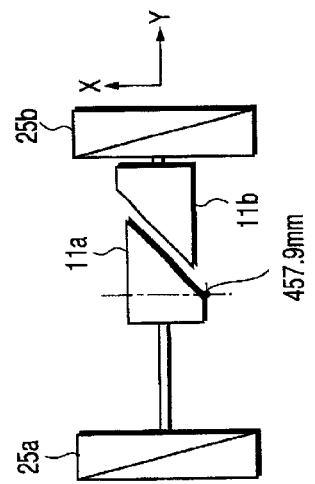
FIG. 7 is a figure which shows a position of the mirror 11a when the fluorescence from the sample is detected over all spectrum bands at selecting only one oscillation line of 457.9 nm.

FIG. 7 is a figure which shows the position of the mirror 11a when all spectrum bands in the fluorescence from the sample when only one oscillation line of 457.9 nm is selected and detected for instance. In FIG. 7, the laser beam of the wavelength of 457.9 nm passes the mirror 11a. The fluorescence from the sample can be reflected by the full width of the mirror 11a, and is detected with the optical detector 24a.

Figure 8:
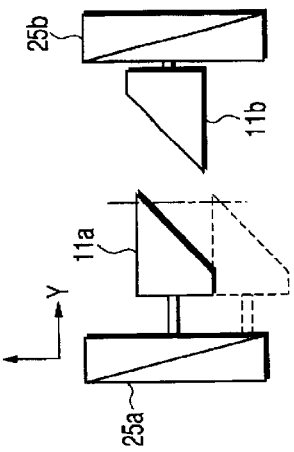
FIG. 8 a figure which shows the movement of the mirror when the spectrum distribution from the sample is detected.
Figure 5:
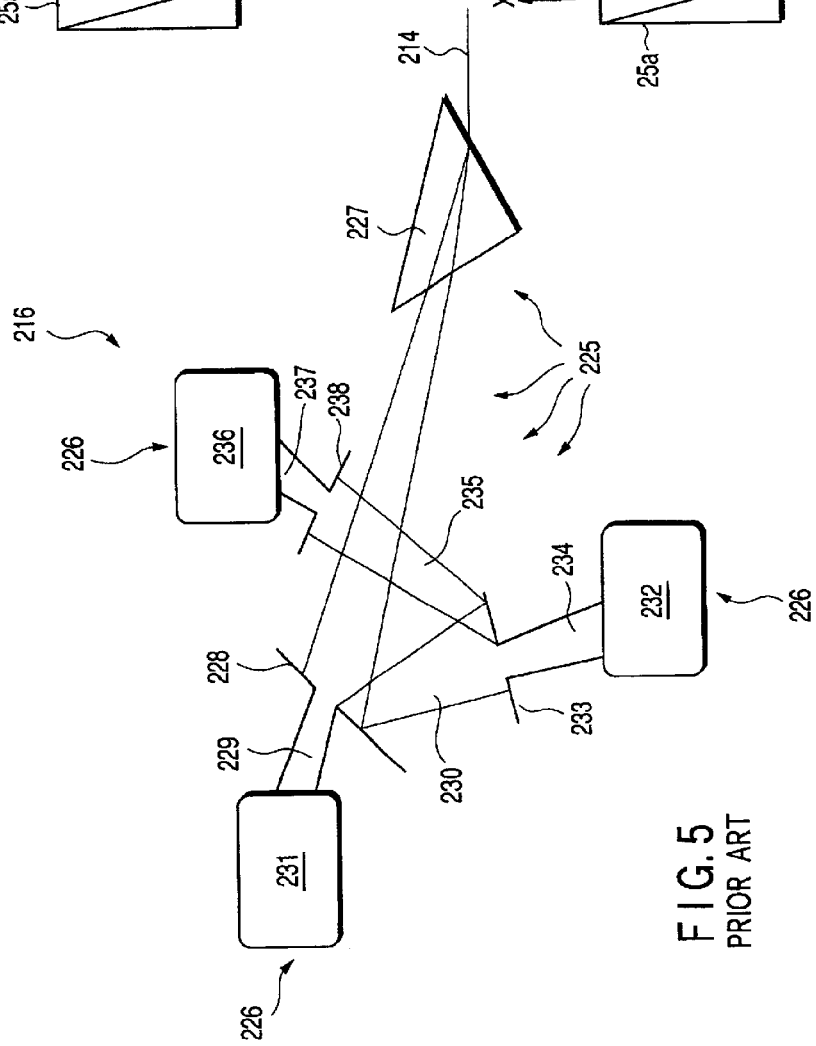
FIG. 5 is a figure which shows a configuration of the conventional confocal scanning laser microscope.

FIG. 8 is a figure which shows the movement of the mirror 11a when the spectrum distribution from the sample is detected.

To have the width equal to the spot diameter condensed by the lens 12 (A2) for the mirror 11a, the stage 25a is driven in the Y direction and the detection signal detected with optical detector 24a is memorized. The signal is synchronized with a suitable sampling signal while driving the mirror 11a in the X direction at this time.

As a result, the fluorescent spectrum distribution from the sample can be obtained.

As mentioned above, since both of the wavelength width and the wavelength region are adjustable for fluorescence from the sample and can be led and detected in each optical detector, it is possible to be applied to a variety of fluorescent sample. In addition, the crosstalk of the fluorescence can be suppressed easily even in a case that the sample is doubly stained.

It is easy to use it since the mirrors 11a and 11b can be automatically set to the selected laser oscillation line. The mirrors 11a and 11b can be used to cut the light flux other than the target oscillation line.

In addition, the detection parts 24a' and 24b' of the optical detectors 24a and 24b are arranged, respectively, at the optically conjugated position of the incident position 30 of the laser light beam to the prism 7 (S1) and the position 31 to which the light from the sample is incident to the prism 13 (S2). Therefore, the fluorescent light flux does not shift at the position of the detection parts 24a' and 24b' of the optical detectors 24a and 24b even if the mirrors 11a and 11b are moved. It is possible to stably perform the optical detection with a detector having the sensitivity distribution characteristic like the photo-multipliers of a side on type in an optical detector and light beam.

Figure 6C:
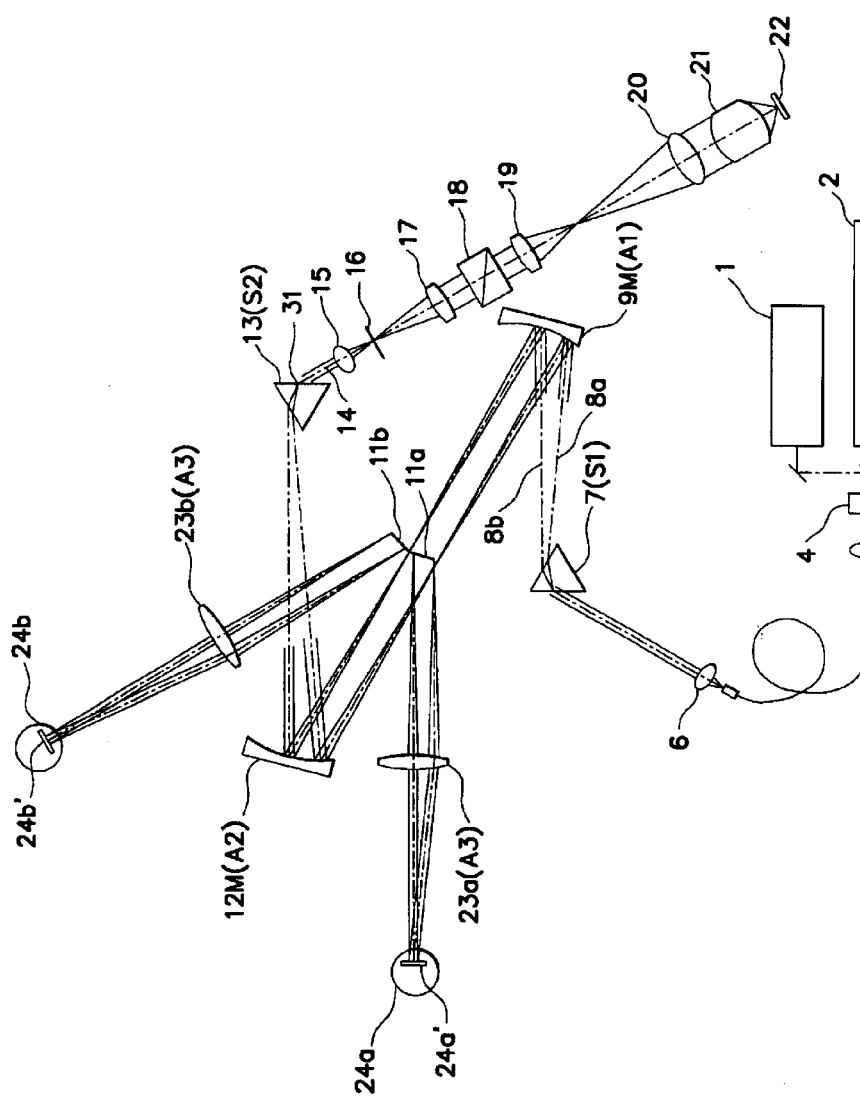
FIG. 6C shows a modification of the outline configuration shown in FIG. 6A.

The lenses 9 and 12 are used as optical parts (A1) and (A2) in the above-mentioned first embodiment. The first embodiment is not limited to this. The optical part can be a concave mirror such as a parabolic mirror or spherical mirror instead of the lens. For example, FIG. 6C shows an outline configuration of the first embodiment in which the lenses 9 and 12 have been replaced by spherical mirrors 9M (A1) and 12M (A2). In this case, the laser beam of each wavelength and fluorescence from the sample 22 completely condense on the spectrum-condensed line 40 since the chromatism is not caused. Therefore, the high wavelength resolution can be obtained.

The diffraction lattice may be used for either of spectrum decomposition part (S1) or spectrum synthesis/decomposition part (S2), or both of them in each embodiment described in the specification. In this case, since the diffraction lattice can greatly take a dispersion amount, the focus distance of the optical parts (A1) and (A2) can be reduced. Therefore, it becomes possible to downsize the device.

(Second Embodiment)

Figure 9:
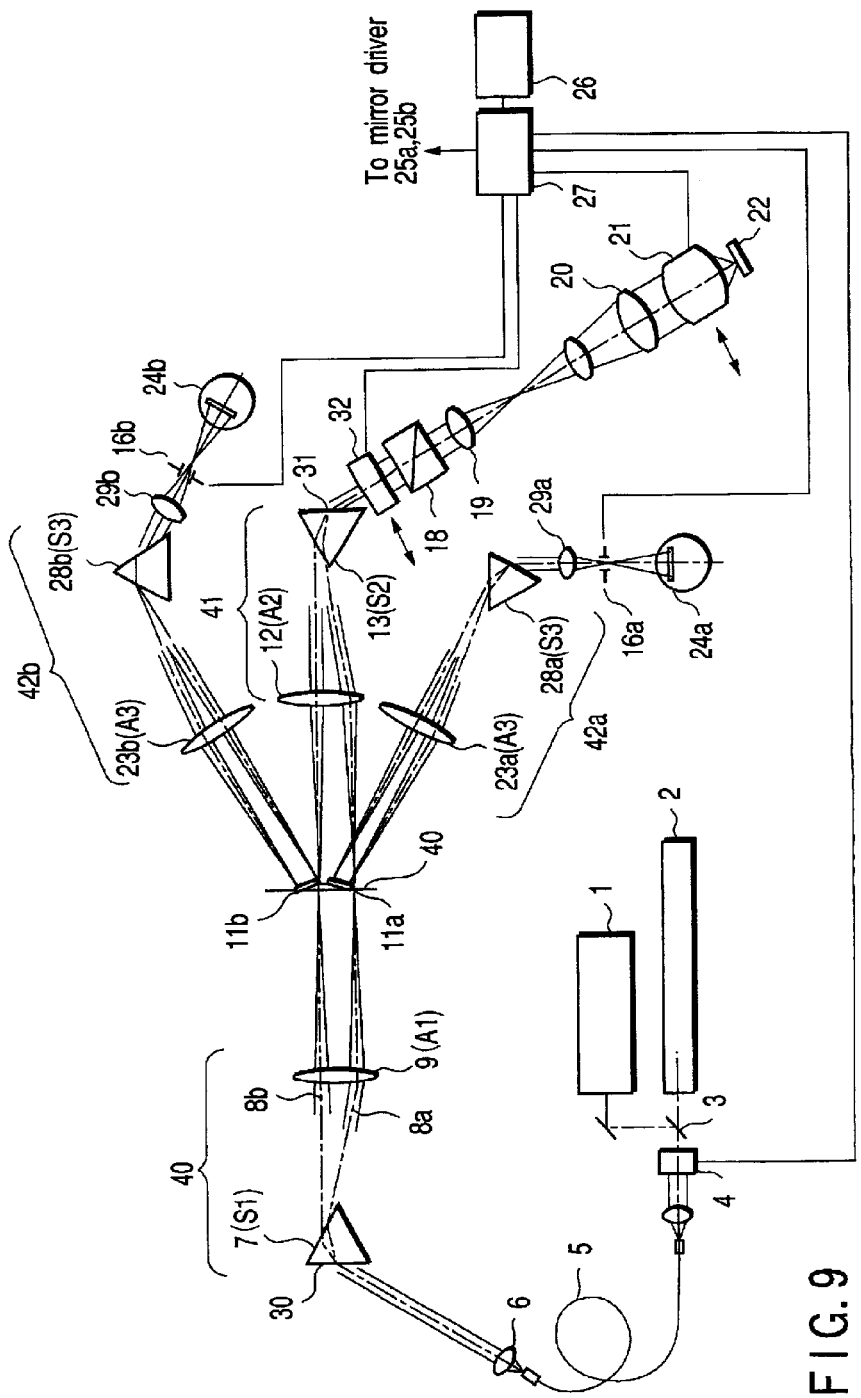
FIG. 9 is a figure which shows an outline configuration of the scanning laser microscope according to the second embodiment.

FIG. 9 is a figure which shows the outline configuration of the scanning laser microscope according to the second embodiment. In FIG. 9, the same reference symbols are fixed to the same parts as those of FIG. 6A and FIG. 6B, and the detailed explanation thereof will be omitted. In the each following embodiment, the configuration of the driver of the mirror is the same as that of FIG. 6A and FIG. 6B excluding especially describing the explanation.

The laser beam output from the prism 13 (S2) is incident to the intermediate magnification change part 32 which can insert and withdraw to/from the optical path and is incident to the X-Y scanner 18. The laser beam flux substantially agrees with the pupil diameter of the objective 21 by setting the magnification of the intermediate magnification change part 32.

The light from the sample is reflected by the mirrors 11a and 11b, and becomes a parallel light beam by being incident to the lenses 23a and 23b in FIG. 9. This parallel light beam is incident to the prisms 28a and 28b and is synthesized to one beam.

Quite the same one as the optical systems 41 and 40 are used for the optical systems 42a and 42b.

The light beam output from each prism is detected by the optical detectors 24a and 24b by passing the confocal diaphragms 16a and 16b arranged at the focus position of the confocal lenses 29a and 29b.

The confocal diaphragms 16a and 16b are configured so that the diaphragm diameter is changeable electrically and the diaphragm diameter is automatically set to the fluorescent characteristic of the sample 22. The diaphragm diameter may be controlled in the controller not shown in the figure by operating the diaphragm diameter from the wavelength which corresponds to the position of the mirrors 11a and 11b, for instance.

A plurality of objectives 21 are attached to the revolver not shown in the figure. And, one the objective 21 is inserted in the optical path selectively with the controller 27 according to the command signal of the instructor 26. The pupil diameter of the objective 21 is different according to the NA and the magnifications. When the controller 27 selects the objective having the large pupil diameter, the intermediate magnification change part 32 (The light flux diameter is magnified to the light flux of an incident laser and is output) is automatically inserted to the optical path. In contrast, when the objective having the small pupil diameter is selected, the intermediate magnification change part 32 is removed from the optical path.

As mentioned above, the incident laser beam to the objective 21 can almost be agreed to the pupil diameter of the objective 21, even when the objective 21 having the large pupil diameter is selected or the objective 21 having the small pupil diameter is selected in the second embodiment. Therefore, it is possible to not only suppress the loss of the illumination light beam, but also to obtain the maximum image formation performance in which the objective has.

In addition, even if the objective having the large pupil diameter is selected or the objective having the small pupil diameter is selected, the fluorescent light flux diameter incident to the prism 13 from the sample is almost constant (almost the same diameter as that of the laser light beam flux output from the prism 13). Therefore, since the spot diameter which is condensed with the lens 12 (A2) does not depend on the selected objective and becomes almost constant, the wavelength resolution by the mirrors 11a and 11b is almost kept constant.

The incident light flux of the laser to the pupil of the objective 21 can be changed with two steps by inserting and withdrawing the intermediate magnification change part 32 to/from the optical path in the second embodiment, but it can be considered that the zoom optical system may be used as the intermediate magnification change part 32. In this case, it becomes possible to give the best incident light flux of the laser to the selected objective 21 on the optical path.

As mentioned above, according to the second embodiment, since the confocal diaphragms are arranged independently on each detection optical path, it is possible to set the best diaphragm diameter for the fluorescent spectrum characteristic of the sample. Therefore, the confocal effect can be achieved without losing fluorescence.

There is an advantage that the scattered light of the laser beam is not detected easily with the optical detector since the confocal diaphragm is arranged between a prism and optical detector.

In addition, the wavelength resolution can be almost made constant regardless of (the pupil diameter of) the selected objective on the optical path, and the maximum image formation performance which the objective has can be obtained.

(Third Embodiment)

Figure 10:
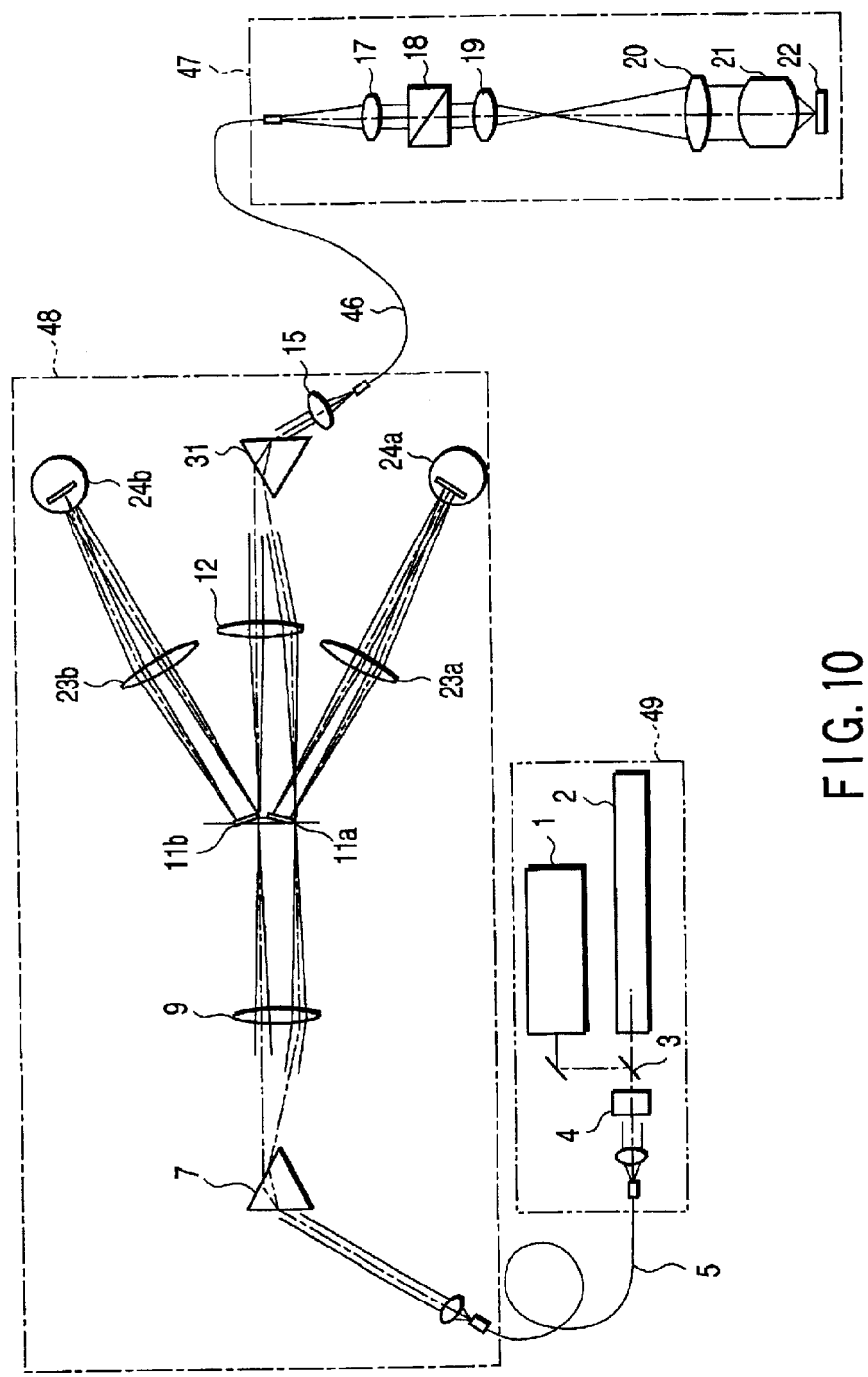
FIG. 10 is a figure which shows an outline configuration of the scanning laser microscope according to the third embodiment.

FIG. 10 is a figure which shows the outline configuration of the scanning laser microscope according to the third embodiment. In FIG. 10, the same reference symbols are fixed to the same parts as those of FIG. 6A and FIG. 6B, and the detailed explanation thereof will be omitted. As shown in FIG. 10, the microscope/scanning device 47 and the spectroscope 48 are connected by the single mode fiber 46 by arranging both ends of the single mode fiber 46 at the focus position of the lens 15 and lens 17 respectively in the third embodiment. As a result, the microscope/scanning device 47 and the spectroscope 48 are configured as another unit. In addition, the laser light source part 49 and the spectroscope 48 are connected by the single mode fiber 46. Since the single mode fiber 46 functions as a spatial filter, the single mode fiber 46 functions as the confocal diaphragm.

The microscope/scanning device 47, the spectroscope 48, and the laser light source part 49 are configured as another unit like the above-mentioned in the third embodiment. It becomes possible to, therefore, downsize the microscope/scanning device 47, and lay out with the high freedom degree.

(Fourth Embodiment)

FIG. 11A and FIG. 11B are figures which show an outline configuration of the scanning laser microscope according to the fourth embodiment. In FIG. 11A and FIG. 11B, the same reference symbols are fixed to the same parts as those of FIG. 6A and FIG. 6B, and the detailed explanation thereof will be omitted. The FIG. 11A is a general view and FIG. 11B is a front view in main part. As shown in FIG. 11A and FIG. 11B, the mirrors 11a and 11b are arranged so that the reflection surface may include the spectrum-condensed line 40 respectively. The mirrors 11a and 11b are arranged to be inclined slightly respectively upward or downward as an angle between the reflection surface and the incident light flux is the angle β.

The reflected light beam from the mirrors 11a and 11b is incident to the lens 12 as 60a and 60b and is detected by the optical detectors 24a, and 24b.

The mirrors 11a and 11b are arranged to have the twisted angle as shown in FIG. 11B by the driving mechanism of the stages 25a and 25b shown in the FIG. 6A and FIG. 6B and is configured to be movable in the same X direction as different direction of the arrow (Y1 and Y2 directions) and spectrum condensed lines 40.

The detection parts 24a' and 24b' of the optical detectors 24a and 24b are arranged, respectively, at the optically conjugated position of the incident position 30 to the prism 7 (S1) of the laser light beam and the position 31 to which the light from the sample is incident to the prism 13 (S2).

In the fourth embodiment, the mirrors 11a and 11b are arranged at a position which is completely corresponding to a position where the lens 9 (A1) and the lens 12 (A2) are condensed. Therefore, the reflection surface is always on the spectrum-condensed line 40 even if the mirrors 11a and 11b are moved. As a result, the wavelength resolution does not degrade at all even if the mirrors 11a and 11b are moved. Therefore, the spectroscope with extremely high wavelength resolution can be provided.

Since the lens 12 is shared as the condenser lens of the detection optical path, a cheap and compact spectroscope can be provided.

The detection parts 24a' and 24b' of the optical detectors 24a and 24b are arranged, respectively, at the optically conjugated position of the incident position 30 to the prism 7 (S1) of the laser light beam and the position 31 to which the light from the sample is incident to the prism 13 (S2). Therefore, the fluorescent light flux does not shift at the position of the detection parts 24a' and 24b' of the optical detectors 24a and 24b even if the mirrors 11a and 11b are moved. Therefore, it is possible to stably perform optical detection with the optical detector with the sensitivity distribution characteristic like the photo-multipliers of a side on type in an optical detector and light beam detect.

(Fifth Embodiment)

Figures 12A, 12B:
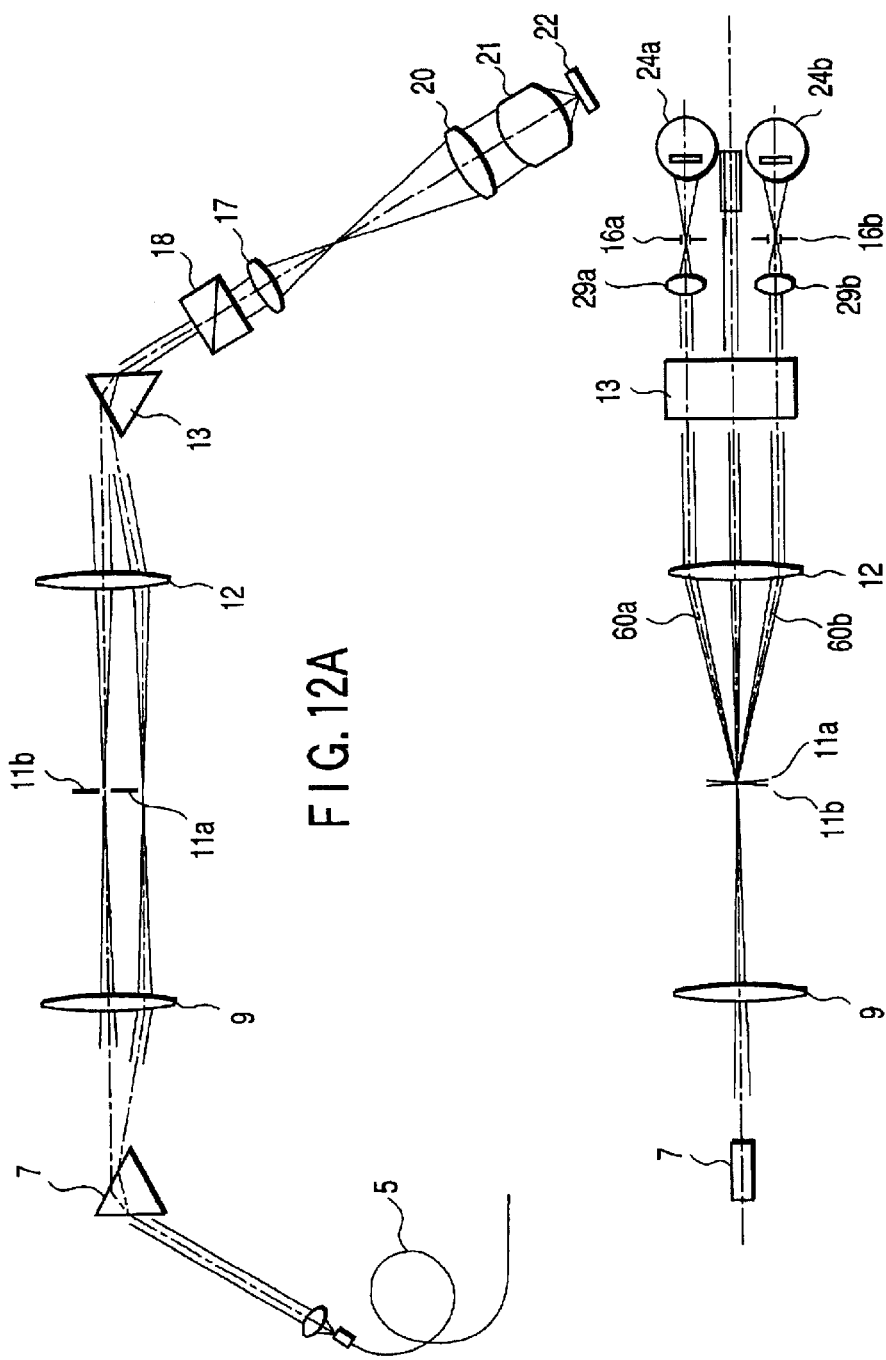
FIG. 12A and FIG. 12B are figures which show an outline configuration of the scanning laser microscope according to the fifth embodiment.

FIG. 12A and FIG. 12B are figures which show an outline configuration of the scanning laser microscope according to the fifth embodiment. In FIG. 12A and FIG. 12B, the same reference symbols are fixed to the same parts as those of FIG. 9, and the detailed explanation thereof will be omitted. As shown in FIG. 12A and FIG. 12B, the mirrors 11a and 11b incline slightly respectively upward and downward as well as the fourth embodiment as shown in FIG. 12B which is the front figure (including the development figure) and are arranged. The light beam reflected from the sample is incident to the lens 12 (A2) as 60a and 60b and becomes a parallel light flux. Thereafter, it is synthesized to one beam by being incident to the prism 13.

The fluorescent of each light flux output from the prism 13 is detected by the optical detectors 24a and 24b by passing the confocal diaphragms 16a and 16b arranged at the focus position of the confocal lens 29a and 29b.

The confocal diaphragms 16a and 16b are configured so that the diaphragm diameter is changeable electrically and is automatically set for the fluorescent characteristic of the sample 22.

The diaphragm diameter may be controlled by calculating the diaphragm diameter from the wavelength which corresponds to the position of the mirrors 11a and 11b for instance with the controller not shown in the figure.

The lens 12 is shared as a condenser lens of the detection optical path according to the fifth embodiment and the prisms 7 and 13 are shared for spectrum synthesis. Therefore, a cheap and compact scanning confocal laser microscope can be provided. Especially, focusing of the beam can be ensured by sharing the prism.

The diffraction lattice may be configured in the fifth embodiment instead of the prisms 7 and 13. Since the diffraction lattice can greatly take large dispersion in this case, it is useful for the miniaturization of the device.

(Sixth Embodiment)

The sixth embodiment is an embodiment which applies four channels to the second embodiment (two channels).

In FIG. 13, the laser light source 1 is a water-cooled argon laser comprising an oscillation line of multi wavelength, and has five oscillation lines of 351 nm, 364 nm, 457.9 nm, 488 nm, and 514.5 nm. The laser light source 2 is a helium neon laser, and has the oscillation line of 543 nm. These laser beams are synthesized by the dichroic mirror 3 for the beam synthesis and is incident to the AOTF 4. The AOTF 4 functions to six above-mentioned oscillation lines as a select filter. Specifically, the AOTF 4 can selectively lead the oscillation line to the optical fiber 5, by selectively applying the RF corresponding to each oscillation line. The controller not shown in the figure controls the positions of the mirror 11a to 11d controlled respectively, by the electric stages 25a to 25d which are movable in the X-Y direction.

Figures 13A, 13B:
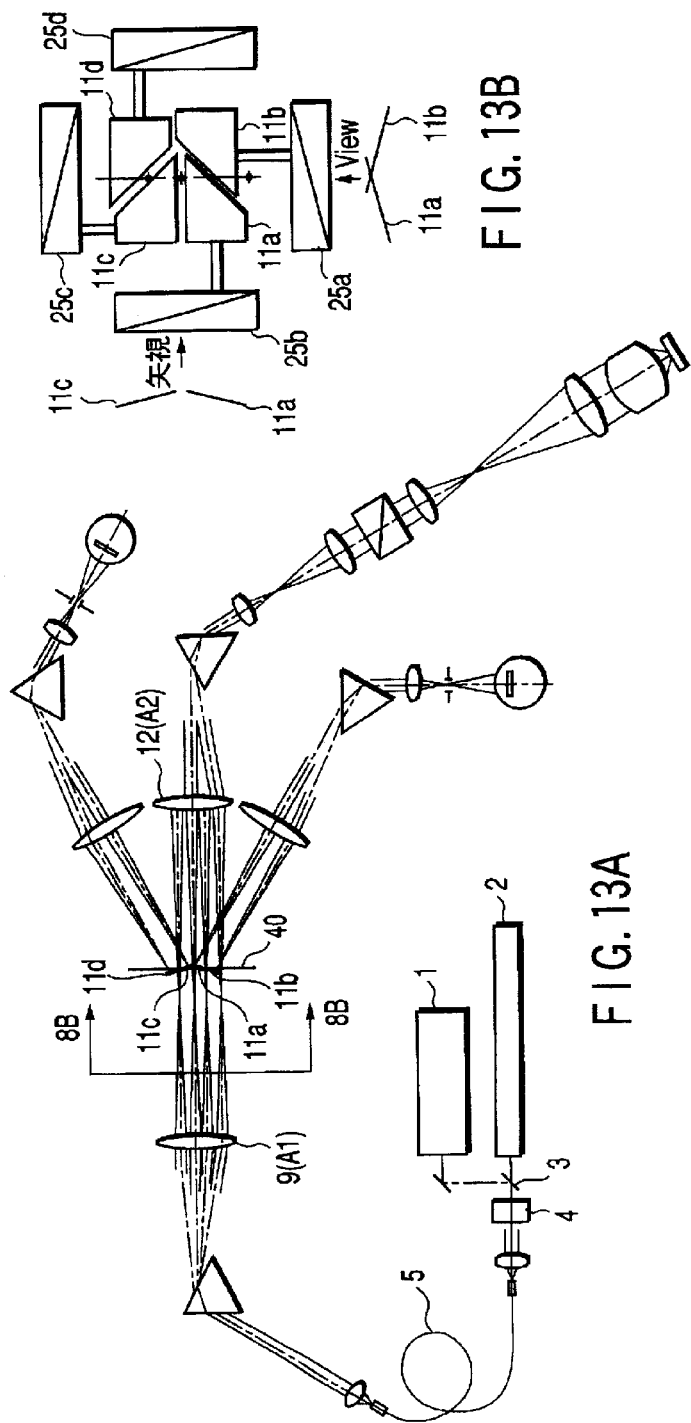
FIG. 13A and FIG. 13B are figures which show an outline configuration of the scanning laser microscope according to the sixth embodiment.

The mirrors 11a and 11b are arranged with the elevation only by the α=15 degree for the spectrum condensed line 40 formed respectively as a focus position of lenses 9 (A1) and 12 (A2) as shown in FIG. 13B which is a view cut along 8B—8B of the FIG. 13A.

In addition, the mirrors 11a and 11b are arranged to be inclined upward or downward slightly as an angle between the reflection surface and the incident light flux becomes the angle β.

As a result, the same detection optical path as a vertical direction to the paper is configured in the FIG. 13A and FIG. 13B.

In the sixth embodiment, since four detection optical paths are provided, the sample with quadplex stain can be observed. Moreover, it is possible to apply also the fluorescent sample excited by UV like the DAPI.

The number of detection optical paths indicates the configuration by which four channels in the embodiment, that is, four mirrors are arranged. It is not limited to this. A device having three detection optical paths (three cannel) may be provided. It is also possible to configure as a device comprising a lot of detection optical paths. The four mirrors one are arranged in the above-mentioned embodiment, in addition, the example of arranging three mirrors in addition is described. It is unnecessary to arrange a plurality of mirrors and the same advantage can be achieved by being able to drive one mirror, preferably, the triangular mirror in the X-Y direction. Moreover, the configuration described here is not limited to the above-mentioned embodiment, but may be used by modifying them within the scope invention.

It is possible to apply to at least other embodiments described in the specification.

(Seventh Embodiment)

FIG. 14A to FIG. 14C are figures which show an outline configuration of the scanning laser microscope according to the seventh embodiment. In FIG. 14A to FIG. 14C, the same reference symbols are fixed to the same parts as those of FIG. 6A and FIG. 6B, and the detailed explanation thereof will be omitted. FIG. 14B is a view cut along 9B—9B of the FIG. 14A which shows the mirror and the configuration of the driver. FIG. 14C is a view cut along 9C of FIG. 14A. As shown in FIG. 14B, the reflection surface of the mirrors 11a and 11b is configured of two ridge lines R1 and R2 which makes an angle not to vertical angle (90 degrees in this example) respectively for the spectrum condensed line 40. (That is, an angle between the ridgelines R1, R2 and the spectrum-condensed line 40 is 45 degree.)

In addition, the fluorescent light flux which is reflected by the mirrors 11a and 11b is passed. The cutoff member 50 (see FIG. 14C) which intercepts the diffraction light flux that the laser beam light flux is diffracted by the mirrors 11a and 11b is arranged between the mirror 11a, 11b, and lenses 23a and 23b (optical parts (A3)).

It is necessary to bring the mirrors 11a and 11b close to the laser beam light flux (457.9 nm and is 514.5 nm in this example) as much as possible to lead a lot of the fluorescence from the sample to an optical detector. But, the laser condense spot has a Rayleigh distribution. Therefore, since a part of the laser beam is diffracted by the mirrors 11a and 11b, for the optical path to be bent, and to face the optical detectors 24a and 24b, there is the possibility that the laser beam is detected by the optical detectors 24a and 24b.

The mirrors 11a and 11b are configured of the mirror comprising a ridgeline in which an angle between ridgeline and the spectrum-condensed line 40 is 45 degrees in the seventh embodiment. In addition, the cutoff member which intercepts the diffraction lattice diffracted by the mirrors 11a and 11b is arranged between the mirrors 11a, 11b, and lenses 23a, and 23b (optical part (A3)). Therefore, since the laser beam is not detected with the optical detector, the fluorescent image from the sample with extremely excellent S/N can be obtained.

(Eighth Embodiment)

Figure 15:
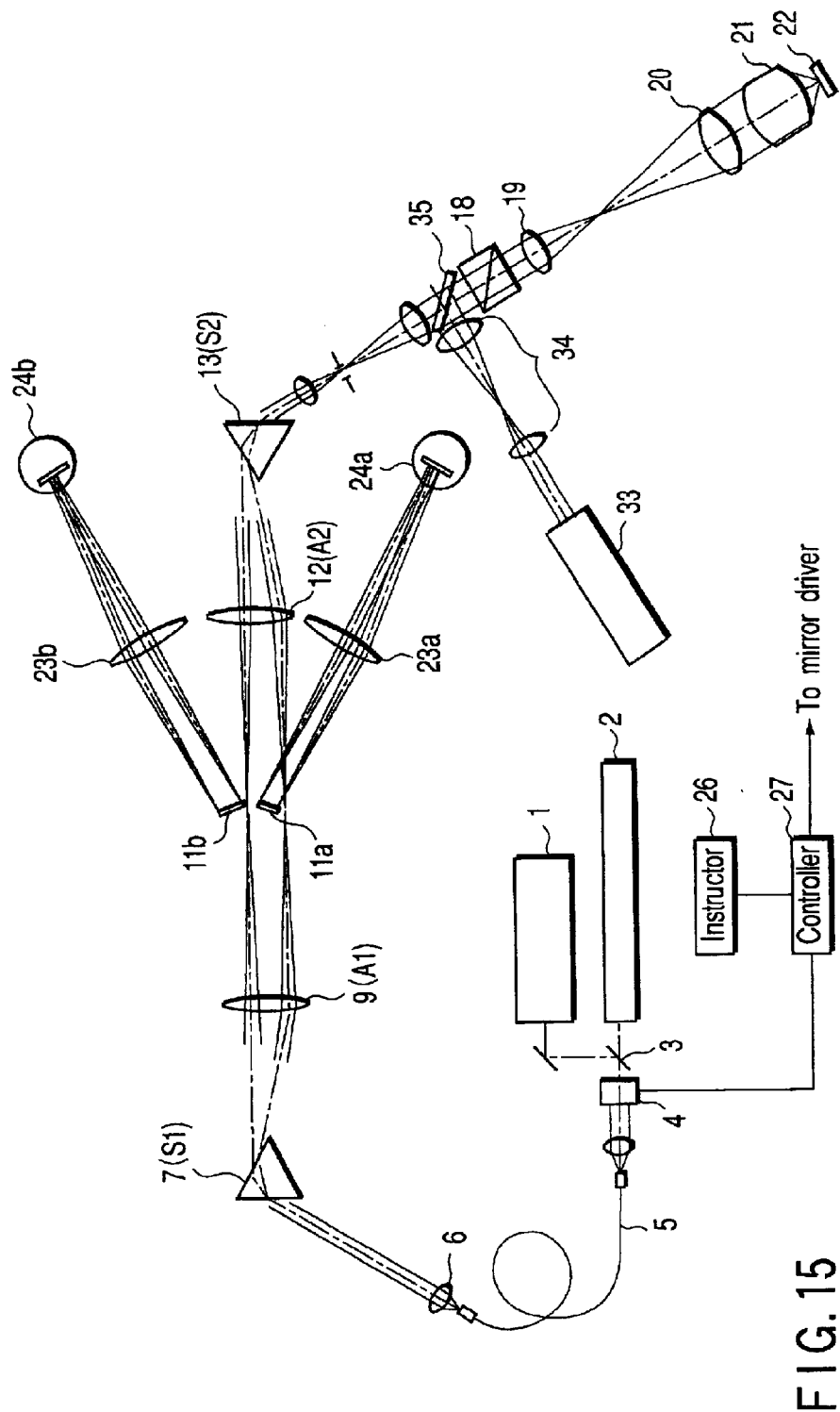
FIG. 15 is a figure which shows an outline configuration of the scanning laser microscope according to the eighth embodiment.

FIG. 15 is a figure which shows the outline configuration of the scanning laser microscope according to the eighth embodiment. In FIG. 15, same reference symbols are fixed to the same parts as those of FIG. 6A and FIG. 6B, and the detailed explanation thereof will be omitted.

In FIG. 15, the laser light source 33 is a water-cooled argon laser comprising an oscillation line with the ultraviolet light beams region, and has the oscillation line of 351 nm.

The beam diameter from the laser light source 33 is magnified as the originated laser beam agrees to the pupil diameter of the objective with the beam expander 34. And, the laser beam is led to the X-Y scanner 18 by the dichroic mirror 35 in which the light beam of 351 nm is reflected and the light beam of longer wavelength than is penetrated, and is irradiated to the sample 22 through the objective 21. Fluorescence (Center wavelength is about 450 nm) from the sample (DAPI) travels the optical path in the opposite direction, penetrates the dichroic mirror 35, and is detected as well as the first embodiment.

Though the aberration correction of a usually high performance is requested as the lenses 9 and 12, if the aberration correction is strictly especially performed in the ultraviolet light beams region, the lens configuration becomes complex. Additionally, since high accuracy is requested of the lens, it causes the cost amount on the manufacture.

In the eighth embodiment, since the laser light beam of is ultraviolet light beam region of 351 nm is led without prisms 7 and 13, the design and manufacture of the lenses 9 and 12 becomes easy, and the cost can be suppressed.

The desired wavelength may be selected with the AOTF 4 by using the laser light source 1 and the laser light source 2 instead of the laser light source 33 though the laser light source 33 is newly arranged in the embodiment. In the fifth embodiment, a similar configuration is possible.

(Ninth Embodiment)

FIG. 16A and FIG. 16B are figures which show an outline configuration of the scanning laser microscope according to the ninth embodiment. In FIG. 16A and FIG. 16B, the same reference symbols are fixed to the same parts as those of FIG. 6A and FIG. 6B, and the detailed explanation thereof will be omitted. In FIG. 16A and FIG. 16B, only the spectrum part is shown not a whole of the scanning laser microscope configuration. FIG. 16B is a figure which shows the configuration of the mirror applied to the FIG. 16A, and is a view cut along 11B-11B of the FIG. 16A. In FIG. 16B, the same reference symbols are fixed to the same parts as those of FIG. 15.

In FIG. 16B, the mirrors 11a to 11d are arranged with elevation α (=15 degrees) respectively for spectrum condensed line 40 as well as FIG. 15. Additionally, the mirrors 11a to 11d are arranged to be inclined slightly respectively upward or downward as an angle between the reflection surface and the incident light flux becomes the angle β. Here, the mirrors 11b and 11d are smaller than the mirrors 11a and 11c.

It is possible to apply a variety of fluorescent sample as well as the sixth embodiment since four detection optical paths are provided in the seventh embodiment. Since the mirror 11a to 11d are arranged at a position which substantially agrees to the condensed position of the lens 12 and the reflection surface is always in neighborhood in the spectrum condensed line 40 even if the mirror 11a to 11d are moved, the wavelength resolution hardly degrades even if the mirrors 11a to 11d is moved. Therefore, the spectroscope which has the high wavelength resolution and can be applied to a variety of the fluorescent sample can be provided.

(Tenth Embodiment)

Figures 17A, 17B:
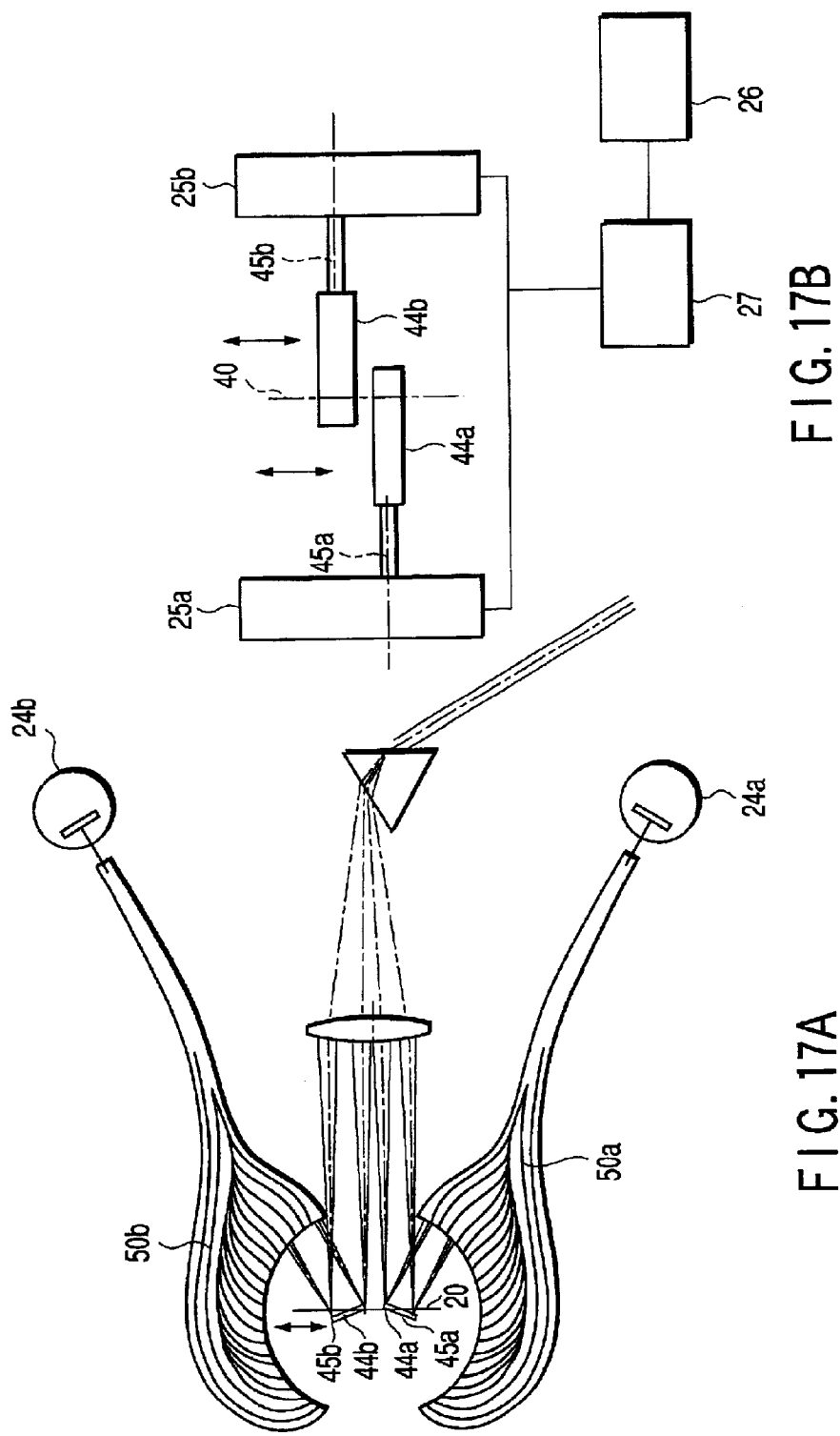
FIG. 17A and FIG. 17B are figures which show an outline configuration of the scanning laser microscope according to the tenth embodiment.

The tenth embodiment will be explained referring to FIG. 17A and FIG. 17B. In FIG. 17A and FIG. 17B, the quadrangle mirrors 44a and 44b are arranged in the bundle fibers 50a and 50b where one end thereof are arranged on the circumference, and are configured rotatably around axes 45a and 45b. In addition, the quadrangle mirrors 44a and 44b can be moved along spectrum condensed line 40. Moreover, the optical detectors 24a and 24b are arranged on the other end of the bundle fibers 50a and 50b. That is, the wavelength width is adjusted by rotating the mirrors 44a and 44b. It is possible to reflect by adjusting the wavelength band by moving along the spectrum-condensed line 40. The reflected light beam from the mirrors 44a and 44b is led to the optical detectors 24a and 24b by the bundle fiber.

According to the embodiment, it is led to the optical detector by using the bundle fiber, the light beam is incident to the same position as the optical detectors 24a and 24b regardless of the spectrum characteristic. Therefore, the spectrophotometry with high accuracy is possible without changing sensitivity even in case of the one for the optical detectors 24a and 24b which have the sensitivity distribution in the light beam part of receiving like the photo-multipliers.

(Eleventh Embodiment)

Figures 18A, 18B:
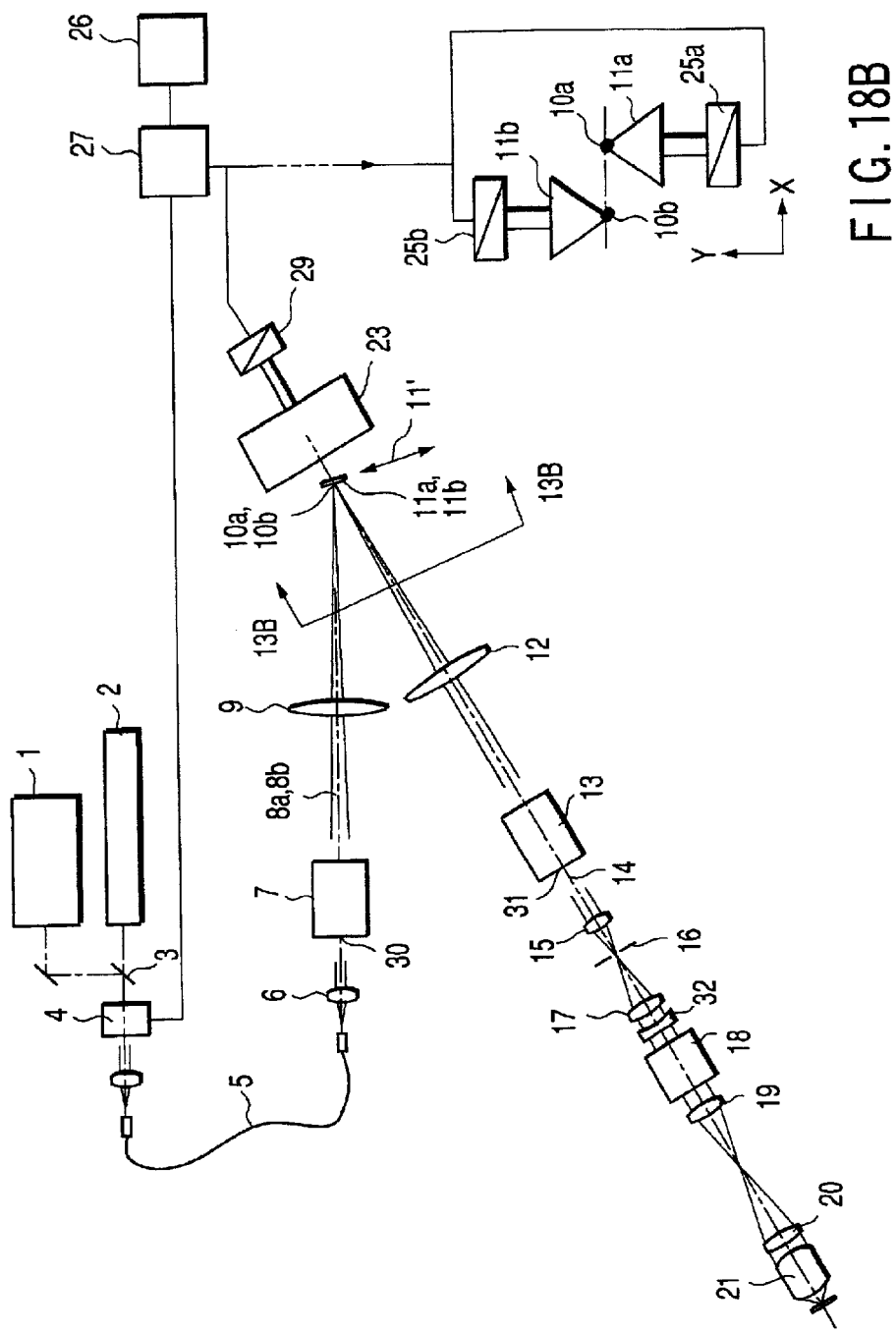
FIG. 18A and FIG. 18B are figures which show an outline configuration of the scanning laser microscope according to the eleventh embodiment.
Figures 19A, 19B:
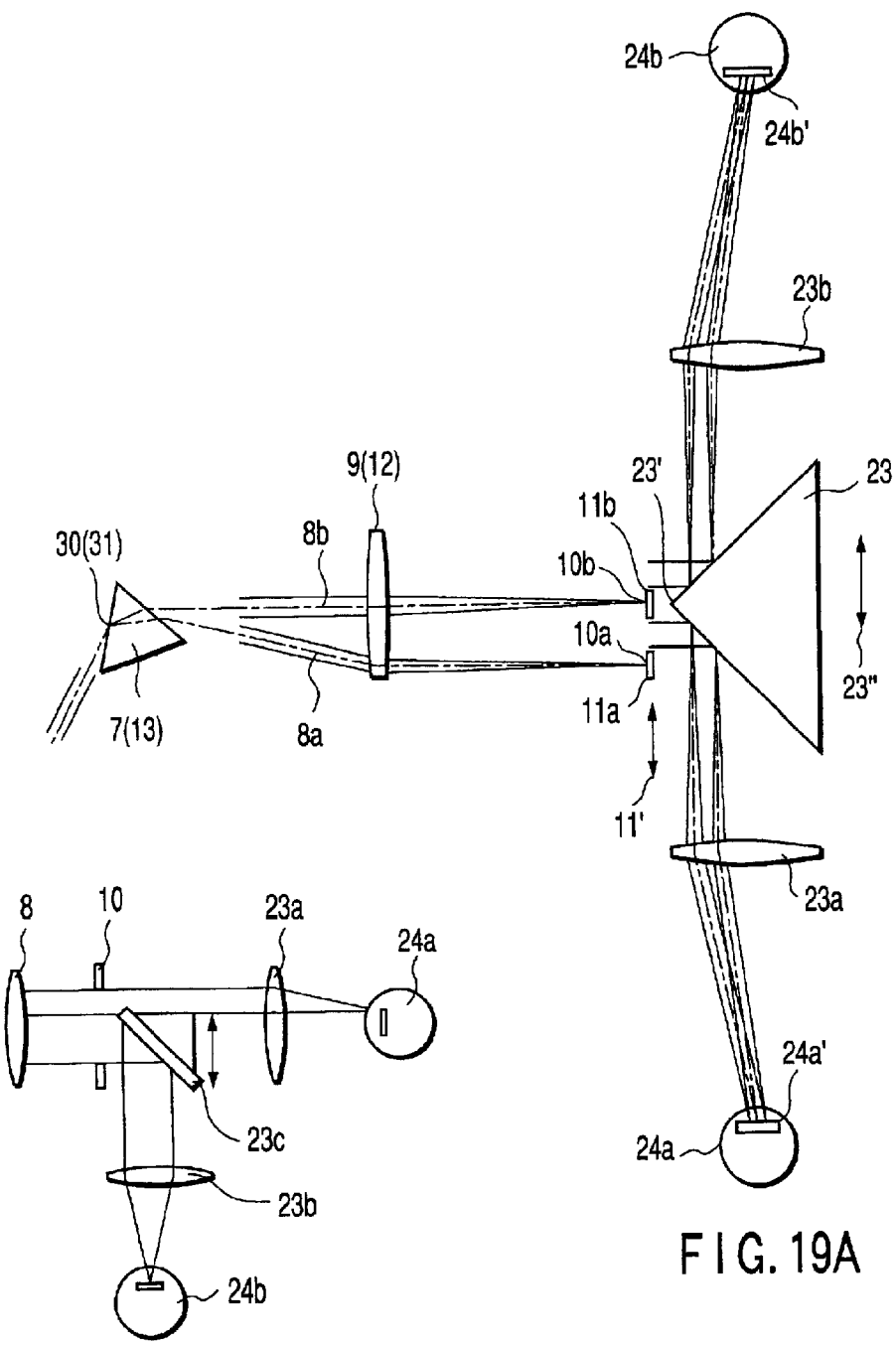
FIG. 19A and FIG. 19B are figures which show details of the detection part in the scanning laser microscope according to the eleventh embodiment.
Figure 20:
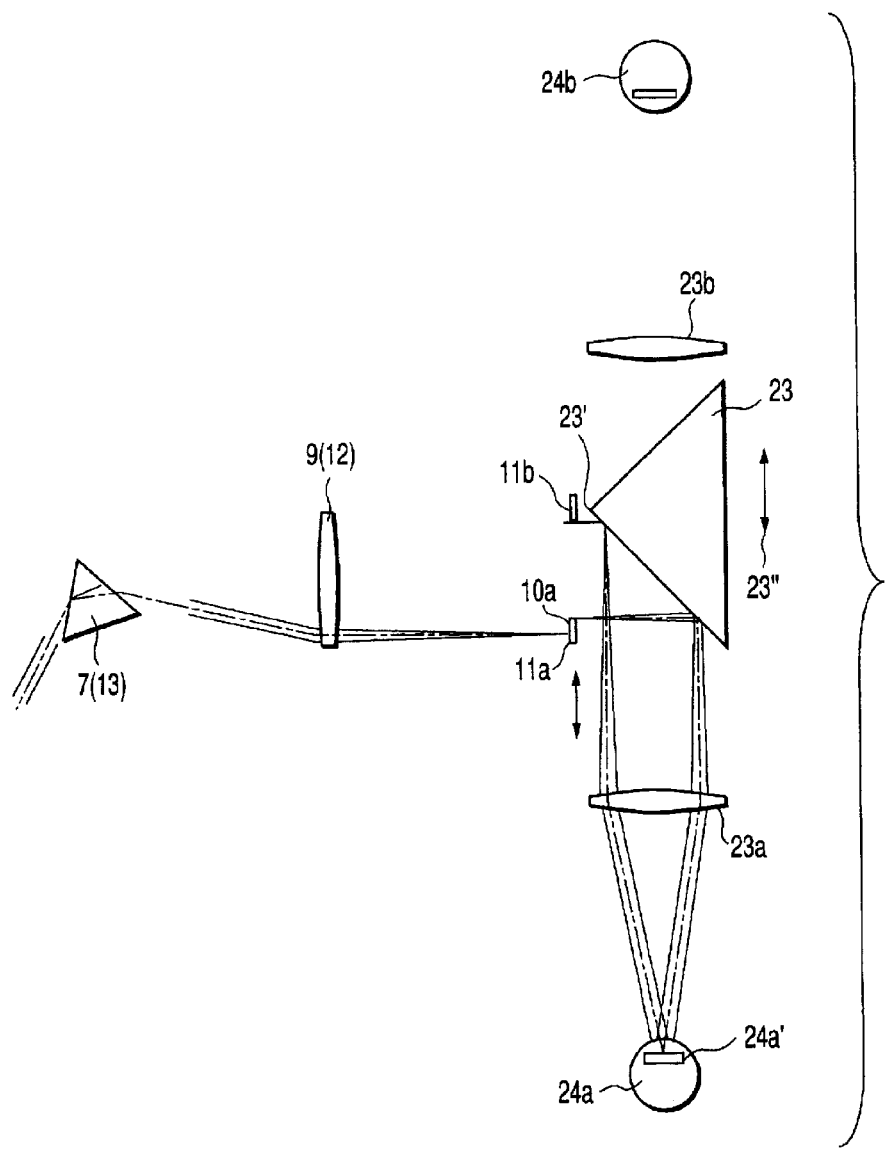
FIG. 20 is a figure which shows details of the detection part in the scanning laser microscope according to the eleventh embodiment.

FIG. 18A and FIG. 18B are figures (excluding an optical detector) which show the configuration of the scanning laser microscope according to the eleventh embodiment of the present invention. FIG. 19A and FIG. 20 are front figures of the FIG. 18A and FIG. 18B which contain an optical detector. In FIG. 18A to FIG. 20, the same reference symbols are fixed to the same parts as those of FIG. 6A and FIG. 6B, and the detailed explanation thereof will be omitted.

In the first embodiment, the laser beams 8a and 8b pass the mirrors 11a and 11b. The fluorescence from the sample 22 is reflected by the mirrors 11a and 11b and is incident to the optical detectors 24a and 24b. In contrast, in the eleventh embodiment, the laser beams 8a and 8b are positioned and adjusted to be reflected by the triangular mirrors 11a and 11b at the condensed positions 10a and 10b. The fluorescence from the sample 22 passes the triangular mirrors 11a and 11b, is reflected to each optical path the light select mirror which is movable in the direction of one axis (arrow direction 23" of the FIG. 19A) arranged immediately after that, here the triangular mirror 23, and is detected by the optical detectors 24a and 24b by passing lenses 23a and 23b. The triangular mirror functions as a light select mirror selects the light flux having the desired wavelength width and the wavelength band, and on the other hand, also functions as shielding member (shielding part) to shield the light flux having the wavelength width and the wavelength band excluding the desired wavelength width and the wavelength band.

The configuration and the function of the triangular mirrors 11a and 11b in the embodiment will be explained in detail. FIG. 18B is a view cut along 13B—13B of the triangular mirrors 11a and 11b (side view).

The mirrors 11a and 11b can respectively be moved by the X-Y stages 25a and 25b in the embodiment as well as the first embodiment. By moving the mirrors 11a and 11b in the X direction, a spectrum band of light beam and reflected laser beam from the sample can be freely set. By moving the mirrors 11a and 11b in the Y direction, the spectrum width of light beam from the reflected sample can be freely set. In addition, by moving the mirrors 11a and 11b in the Y direction, the mirrors 11a and 11b can be removed from the optical path.

The mirror 23 can be moved in the direction of the arrow 23" shown in the FIG. 19A and FIG. 20 by the electric stage 29. A spectrum band of the light beam, which reflects to the optical detectors 25a and 25b, can be set by moving the mirror 23 by being synchronized such that the vertex 23' of the mirror 23 agrees to the center axis of the triangular mirror 11b.

In the embodiment, the position of the triangular mirrors 11a and 11b is set to be applied to the oscillation lines of 457.9 and 514.5 nm as a laser beam. It is not limited to this, and the position of a triangular mirror may be set for arbitrary combination of four oscillation lines or one arbitrary oscillation line shown in FIG. 20.

And, when the oscillation line of the laser is selected by the fluorescent characteristic of the sample which is the observation object, the command signal is given from the instructor 26 to the controller 27. The controller 27 controls the AOTF 4, outputs the RF corresponding to a target oscillation line, and drives the X-Y stages 25a and 25b by the instruction signal. The controller 27 controls the position of the mirrors 11a and 11b to reflect a target oscillation line surely, and controls the position of the triangular mirror 23 so that the fluorescence from the sample is detected in the maximum. Of course, when the sample is a double stain, and the crosstalk of the fluorescence becomes a problem, it is possible to limit an optical detector and spectrum width which passes and to shift a spectrum band by driving the X-Y stage in the Y direction from the instructor 26.

According to the embodiment since the triangular mirrors 11a, 11b, and the triangular mirror 23 are automatically set to the selected laser oscillation line, it is easy to use it.

(Twelfth Embodiment)

FIG. 21 is a figure (excluding an optical detector) which shows the configuration of the scanning laser microscope according to the twelfth embodiment. FIG. 22 is a front figure of FIG. 21 which contains an optical detector. In FIG. 21 and FIG. 22, the same reference symbol is fixed from the FIG. 18A to the same part as FIG. 20, and the detailed explanation thereof will be omitted.

As shown in FIG. 21, the laser beam output from the prism 13 is incident to the X-Y scanner 18. By suitably setting the focus distance of the collimator lens 6, the laser beam substantially agrees to the pupil diameter of the objective 21. And, the light from the sample 22 passes the triangular mirrors 11a and 11b and is reflected to each optical path with the deflector, i.e., triangular mirror 23 as shown in FIG. 22. The light beam which is reflected with the triangular mirror 23 is incident to the lenses 24a and 24b' and is incident to the prisms 32a and 32b and is synthesized in one beam after becoming a parallel light beam. The light beam output from each prism is detected by the optical detectors 24a and 24b by passing the confocal diaphragm 34a and 34b arranged at the focus position of the confocal lens 33a and 33b. The diaphragm diameter of the confocal diaphragms 34 and 34b can be changed electrically, and the diaphragm diameter is set for the fluorescent characteristic of the sample 22 automatically.

In the embodiment, since the confocal diaphragm is arranged independently on each detection optical path, it is possible to set it in the optimal diaphragm diameter for the fluorescent spectrum characteristic of the sample, the device which can achieve a confocal effect without losing fluorescence can be provided. There is an advantage that the scattered light beam of the laser beam is not detected easily with the optical detector since the confocal diaphragm is arranged between the prism and the optical detector.

(Thirteenth Embodiment)

Figure 23:
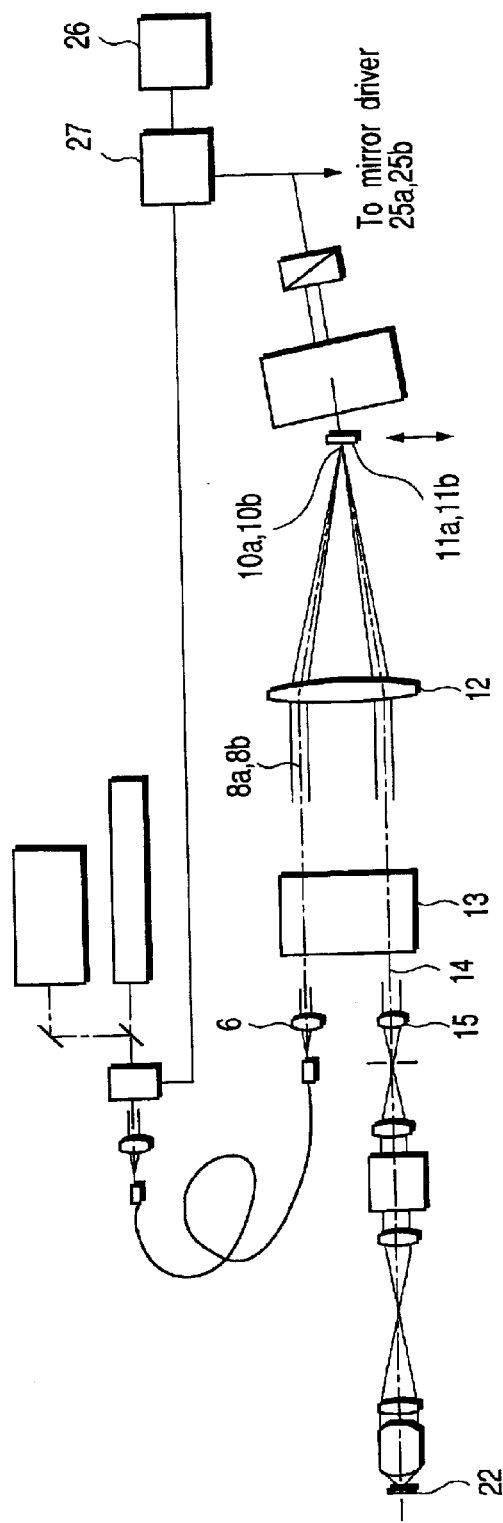
FIG. 23 is a figure which shows an outline configuration of the scanning laser microscope according to the thirteenth embodiment.

FIG. 23 is a figure (an optical detector is excluded) which shows the configuration of the scanning laser microscope according to the thirteenth embodiment. In FIG. 23, the same reference symbols are fixed to the same parts as those of FIG. 18A and FIG. 18B, and the detailed explanation thereof will be omitted.

As shown in FIG. 23, the laser beam output from the collimator lens 6 is incident to the upper part of the prism 13, which separates the spectrum, and is output as the laser beams 8a and 8b. The laser beams 8a and 8b are incident to the upper part of the lens of the lens 12 respectively, advances there a little downward, and is condensed on the triangular mirrors 11a and 11b arranged substantially at the focus position of condense the lens 12 as 10a and 10b. Then, the condensed laser beam inclines downward at the same time as reflecting, passes the lens 12 again, and becomes a parallel light beam. The parallel laser beam is incident to the lower side part of the prism 13, and the spectrum is synthesized to become one laser beam 14. The laser beam 14 is incident to the lens 15 and is connected with the microscope.

The light from the sample 22 returns in the opposite direction on the optical path of the microscope, and is incident from the lower side part of the prism 13, which separates the spectrum, and is condensed to the focus position of the lens 12. Fluorescence from the sample 22 passes the triangular mirrors 11a and 11b, and is led to the detection optical path of FIG. 19A indicated as the eleventh embodiment, and then the fluorescence from the sample is detected.

Since the prism 13 and the lens 12 of the excitation optical path and the detection optical path are shared in the embodiment, a cheap and compact scanning laser microscope can be provided.

To set a spectrum band of light from the sample led to an individual optical detector arbitrarily, the deflector is used for the above-mentioned embodiment that a part of the laser beam is reflected and the light from the sample is partially passed. The present invention is not limited to this, but is possible to apply to a various optical systems within the scope of the invention. For instance, the application of the embodiment of the present invention which uses the mirrors 11a and 11b to lead the light from the sample is also possible.

It is not limited to the triangular mirror used as the deflector as above-mentioned embodiment. For instance, the following configurations may be applied to. The optical detectors shown in FIG. 19B are arranged on the two optical paths of the light from the sample and the optical path in a vertical direction to an optical axis of light from the sample. And, the inclined mirror, the mirror 23c fixed in the inclination of 45° here, can be moved in a vertical direction for an optical axis of light from the sample. The light from the sample can be led to each optical detector by dividing into the reflection and penetration by moving the mirror like this.

(Fourteenth Embodiment)

Figures 24A, 24B:
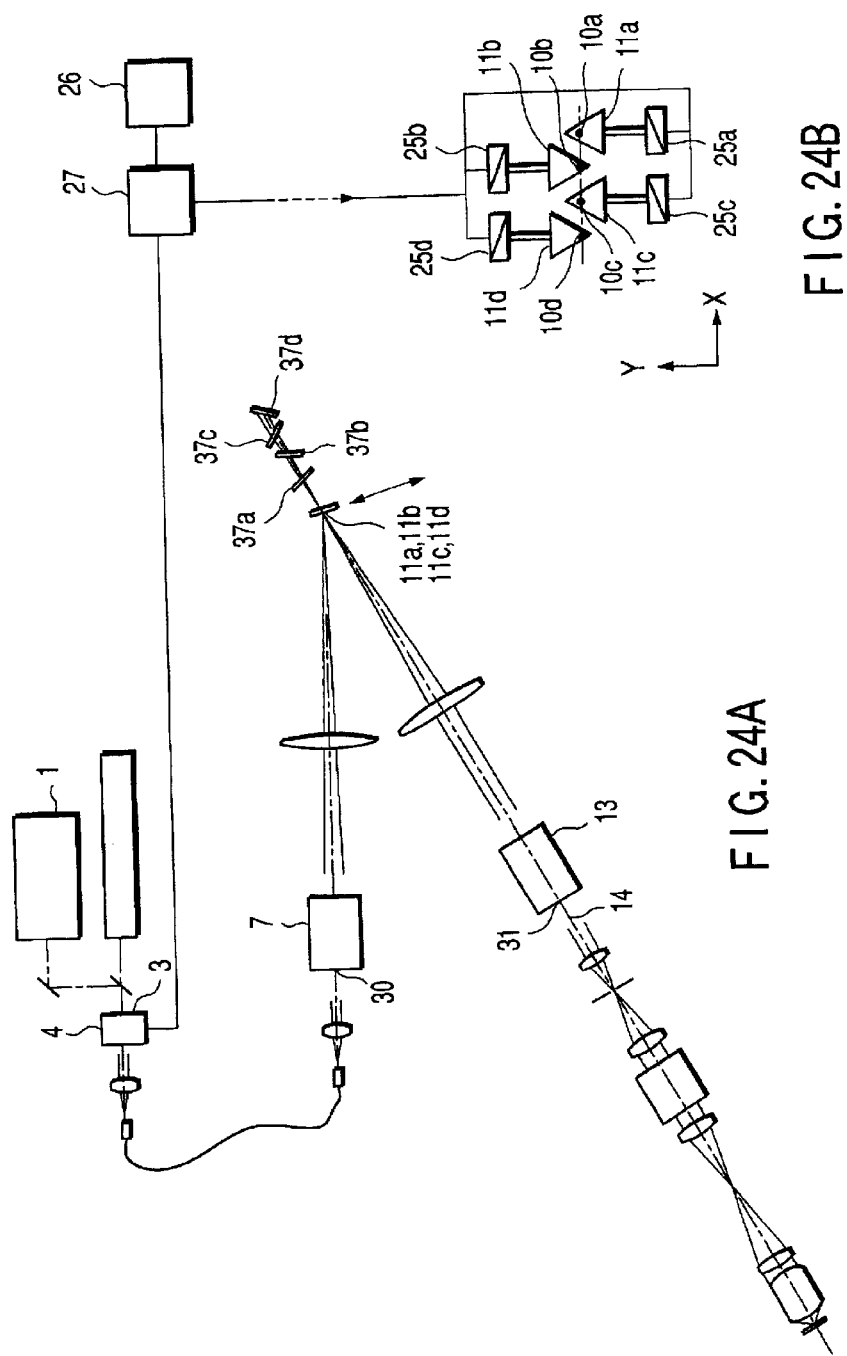
FIG. 24A and FIG. 24B are figures which show an outline configuration of the scanning laser microscope according to the fourteenth embodiment.
Figure 25A:
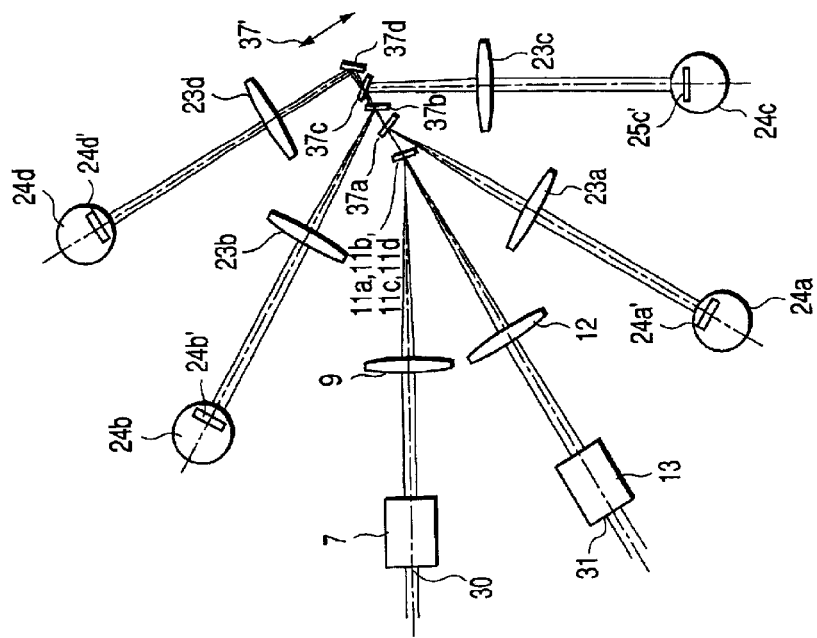
FIG. 25A to FIG. 25C are figures which show details of the mirror in the scanning laser microscope according to the fourteenth embodiment.

FIG. 24A and FIG. 24B are figures (excluding an optical detector) which show the configuration of the scanning laser microscope according to the fourteenth embodiment. FIG. 25A is a figure which contains an optical detector and a front figure of the FIG. 24A and FIG. 24B. The sixth embodiment is an embodiment which applies four channels to the first embodiment (two channels).

In FIG. 24A and FIG. 24B, the laser light source 1 is a water-cooled argon laser comprising an oscillation line of multi wavelength, and has the oscillation lines of 351 nm, 364 nm, 457.9 nm, 488 nm, and 514.5 nm. The laser light beams are synthesized by the dichroic mirror 3 for beam synthesis, and is incident to the AOTF4 which functions as a selection filter for above-mentioned six oscillation lines. the AOTF 4 applies the RF to each oscillation line and can lead the oscillation line to the optical fiber 5 selectively.

The triangular mirrors 11a to 11d are positioned respectively with the controller 27 through the electric X-Y stages 25a to 25d which are movable in the X-Y direction.

Figure 25C:
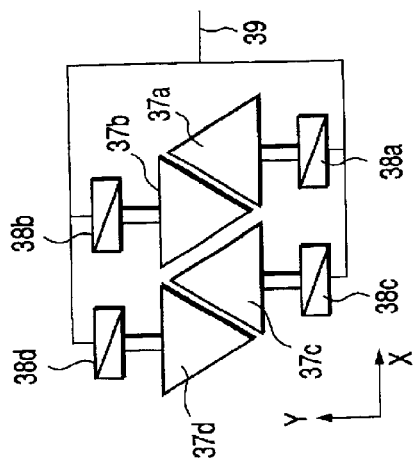
Figure 25B:
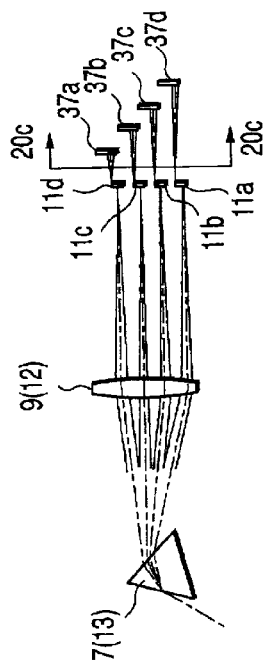

In FIGS. 25A to 25C, the fluorescence from the sample 22 passes the triangular mirrors 11a to 11d and the fluorescence is reflected to each optical path by the triangle mirrors 37a to 37d which are arranged immediately after that and are movable in two-axes directions (direction in the arrow direction 37' of FIG. 25A to FIG. 25C and a vertical direction to the paper). The fluorescence which is reflected from the triangular mirrors 37a to 37d is detected by the optical detectors 24a to 24d by passing lenses 23a to 23d.

As shown in FIG. 25A, the triangular mirrors 37a to 37d have different inclination angles, respectively, for a vertical direction to an optical axis and are inclined upward or downward such that each of fluorescence is reflected in the different directions.

Here, the configuration and the function of the triangular mirrors 37a to 37d will be explained in detail.

FIG. 25C is a side view of the triangular mirrors 37a to 37d (view cut along 20C—20C of FIG. 25B).

The triangular mirrors 37a to 37d are configured to be movable by the X-Y stage 38a to 38d, respectively, are connected the controller 27 through the wiring 39, and the positions thereof are controlled by the controller 27. The spectrum band of the fluorescence reflected from the sample can be freely set by moving the X-Y stage in the X direction. Moreover, the spectrum width of light beam reflected from the sample can be freely set by moving the X-Y stage in the Y direction. The mirrors can be removed from the optical path by moving the X-Y stage in the Y direction.

The detection parts 24a' and 24b' of the optical detectors 24a and 24b are arranged, respectively, at the optically conjugated position of the incident position 30 to the prism 7 of the laser light beam and the position 31 to which the light from the sample is incident to the prism 13.

In the embodiment, it is possible to apply the fluorescent sample with quadplex stain since four detection optical paths are provided.

(Fifteenth Embodiment)

FIG. 26A and FIG. 26B are figures which show the configuration of the scanning laser microscope according to the fifteenth embodiment. In FIG. 26A and FIG. 26B, the same reference symbols are fixed to the same parts as the FIG. 24A, FIG. 24B, and the FIG. 25A to FIG. 25C, and the detailed explanation thereof will be omitted.

As shown in FIG. 26A and FIG. 26B, the fluorescence from the sample 22 passes the triangular mirrors 11a to 11d, and is detected the optical detector 24 which is arranged immediately after that, can detect a plurality of movable light in one axis direction (arrow direction 40' of FIG. 26A and FIG. 26B) at the same time, and has a plurality of optical detectors arranged in straight, for instance, a multi-anode photo multiplier tube.

The above-mentioned optical detector 24 is configured movably by the electric stage 55, and the position thereof is controlled by the controller 27. The fluorescence from the sample 22 which corresponds to four arbitrary oscillation lines is detected at the same time by moving the optical detector 24.

Thus, by using the optical detector which can detect a plurality of light beams at the same time, the compact scanning laser microscope can be provided.

In the embodiment, the diffraction lattice can be configured instead of the prism 7. Since the diffraction lattice can greatly take dispersion, it is useful for the miniaturization of the device. The diffraction lattice is considered to be used of course instead of the prism 13, but since the diffraction lattice has the polarized light beam characteristic, it is more ideal to disperse the fluorescence (random polarized light) from the sample.

The present invention is not limited to each above-mentioned embodiment. The present invention can be modified within the scope of the invention.

According to the embodiment of the present invention, the spectrum type scanning laser microscope which can suppress the degradation of the beam quality of the laser beam on the (illumination) optical path until the laser beam is led to the objective can be provided. In addition, the scanning laser microscope which hardly degrades the beam quality of the laser beam caused by the adhesion of the dust which floats in the device to the optical system can be provided.

By suitably setting the elevation of the mirror which reflects fluorescence from the sample, the scanning laser microscope with high freedom degree of the layout of which the photo-multipliers of a side on type can be easily arranged also with can be provided.

The scanning laser microscope which can easily arrange the independent confocal diaphragm to each optical detection path configured as a multi channel can be provided.

According to the embodiment of the present invention, in the spectroscope which narrows the fluorescence within especially two or more of the spectrum ranges and detects light respectively, the spectroscope with extremely high resolution and high accuracy.

According to the embodiment of the present invention, the spectrum type scanning laser microscope which can adjust to the various laser beams can be provided.

A compact and cheap scanning laser microscope can be provided by using the single prism which separates and synthesizes the light from the laser light beam and the sample and the single lens which condenses the light from the laser light beam whose spectrum is separated.

The following invention can be led from each above-mentioned embodiment. The following invention may be applied solely or applied by properly combining them.

A mirror driving mechanism according to the first aspect of the present invention is characterized by comprising: a driver configured to drive at least one mirror which reflects a light flux while adjusting a wavelength width and a wavelength band of the light flux separated in a spectrum; and a controller configured to control the driver.

A mirror driving mechanism according to the second aspect of the present invention is characterized by comprising: a driver configured to drive a mirror as at least one shielding member to shield a light flux while adjusting a wavelength width and a wavelength band of the light flux separated in a spectrum; and a controller configured to control the driver.

A spectroscope according to the third aspect of the present invention is characterized by comprising: a spectrum decomposition part configured to separate an incident light flux into a desired spectrum; at least one reflector configured to reflect the spectrum while adjusting a wavelength width and a wavelength band of the separated light flux; and at least one detector configured to receive and detect the light flux reflected by the reflector.

A spectroscope according to the fourth aspect of the present invention is characterized by comprising: a spectrum decomposition part configured to separate an incidence light flux into the desired spectrum; at least one shielding part configured to intercept the light flux while adjusting a wavelength width and A wavelength band of the light flux which is separated to the spectrum; and at least one detector which receives the light flux, which is not shielded by the cutoff part and passes it, and detects the light flux.

Preferable modes of the spectroscope according to the third aspect and the fourth aspect are as follows. The following modes may be applied solely or applied by properly combining them.

(1) A deflector arranged between the shielding part and the detector configured to deflect at least one of the light flux is further provided.

(2) A first optical system arranged between the spectrum decomposition part and the reflector configured to converge the separated light flux to the spectrum is further provided, and a reflection surface of the reflector is arranged substantially at a condense position.

(3) The reflector has a mirror and a shape with a vertical angle, and the reflector comprises: a first movement axis which substantially agrees to a direction where the light flux is separated to the spectrum by the spectrum decomposition part; a second movement axis which is substantially normal to the first movement axis and does not agree to a direction of the light flux; and a driving mechanism which moves the mirror along the first movement axis and the second movement axis.

(4) The mirror is arranged with an elevation α for a spectrum-condensed line formed as a position where the light flux is condensed.

(5) The mirror is arranged at a position where a reflection surface substantially includes a spectrum condensed line, and an angle β between the reflection surface and the incidence light flux is not 90 degrees.

(6) The mirror is arranged at an elevation α for a spectrum condensed line formed as a position where the light flux condenses by the condenser lens, and an angle β between a reflection surface and the incidence light flux is not 90 degrees.

(7) The at least one detector is arranged at a substantially conjugated position to a position where the incidence light flux is incident to the spectrum decomposition part (8) The reflector (or, shielding part) includes a plurality of reflectors (or, shielding parts), at least one reflector (or, shielding part) is movable over the predetermined all spectra range.

(9) The reflectors (or, shielding parts) are arranged in different directions, respectively.

(10) The spectrum decomposition part includes a prism or a diffraction lattice.

(11) Confocal optical systems are arranged in the detection optical path corresponding to at least one detector respectively.

A scanning laser microscope which scans on a sample with a scanning device through an objective with a laser light beam having at least one spectrum region and narrows a fluorescence from the sample within a desired spectrum range to perform an optical detection, according to the fifth aspect of the present invention is characterized by comprising: a spectrum decomposition part configured to separate the laser light beam having at least one spectrum band into the spectrum; a first optical system configured to condense the laser light beam which is separated to the spectrum; a second optical system configured to condense a light from the sample while collimating the laser light beam; a spectrum synthesis/the decomposition part configured to separate the light from the sample to the spectrum while synthesizing the laser light beam which is separated to the spectrum; at least one reflector arranged substantially at a focus position of the first optical system and the second optical system, and configured to pass the laser light beam having at least one spectrum region and reflect a part of the light from the sample; and an optical detector which detects the light from the sample led by the reflector, respectively.

A scanning laser microscope which scans on a sample with a scanning device through an objective with a laser light beam having at least one spectrum region and narrows a fluorescence from the sample within a desired spectrum range to perform an optical detection, according to the sixth aspect of the present invention is characterized by comprising: a spectrum decomposition part configured to separate the laser light beam having at least one spectrum band into the spectrum; a first optical system configured to condense the laser light beam which is separated to the spectrum; at least one reflector arranged substantially at a focus position of the first optical system, and configured to reflect the laser light beam which is separated to the spectrum at least partially and pass the light from the sample with being able to adjust a wavelength width and a wavelength band; a second optical system configured to substantially condense a light from the sample while collimating the laser light beam reflected with the reflector; and an optical detector which detects the light from the sample which passes the reflector, respectively.

Preferable modes of the spectroscope according to the third aspect and the fourth aspect or the scanning laser microscope according to the fifth aspect and the sixth aspect are as follows. The following invention may be applied solely or applied by properly combining them.

(1) A confocal lens connected with the second optical system and configured to condense the light from the sample; and a confocal diaphragm arranged at a focus position of the confocal lens are further provided, and these are connected with a scanning device.

(2) The optical detector is arranged substantially at a optically conjugated position as a position where the light from the sample is incident to the spectrum synthesis/decomposition part.

(3) A first optical system which is arranged between the reflector (the shielding part) and the detection part and collimates the light flux reflected by the reflector (passing the shielding part) is provided.

(4) The detection optical path comprises: a third optical system which collimates the light from the sample reflected by the reflector; a synthetic part configured to synthesize a spectrum of the light from the sample through said third optical system; a confocal lens which condense the light from the sample through the spectrum synthesis part; a confocal diaphragm arranged at a focus position of the confocal lens; and an optical detector which detects the light from the sample which passes the confocal diaphragm, and the detection optical path is connected with each reflector.

(5) The first optical system and the second optical system have the same configuration (or are shared).

(6) The spectrum decomposition part and the spectrum synthesis/decomposition part have the same configuration.

(7) An intermediate magnification change part arranged between the spectrum synthesis/decomposition part and the objective.

(8) The intermediate magnification change part can be set corresponding to a pupil diameter of the used objective.

(9) The shielding part has a mirror and a shape with a vertical angle, and the reflector comprises: a first movement axis which substantially agrees to a direction where the light flux is separated to the spectrum by the spectrum decomposition part; a second movement axis which is substantially normal to the first movement axis and does not agree to a direction of the light flux; and a driving mechanism which moves the mirror along the first movement axis and the second movement axis.

(10) The reflection surface of the mirror has two ridge lines with a vertical angle not normal to a direction where the laser light beam is separated to the spectrum by spectrum decomposition part, and a cutoff member which intercepts the light flux that the incidence light flux is diffracted by the mirror is arranged on the optical path.

(11) The first optical system and the second optical system comprise a spherical mirror or a parabola mirror, respectively.

(12) A single mode fiber arranged between the spectrum synthesis/decomposition part and the scanning device and configure to lead the laser light beam to the objective is further provided.

(13) At least one deflector configured to reflect a light flux from the sample which passes the reflector and deflect a traveling direction of the light is further provided.

(14) The deflector comprises a mirror with a shape of triangular component arranged movably along two directions of a direction which substantially agrees a spectrum decomposition direction where a light flux is separated by the spectrum decomposition part and a direction which is substantially normal to the direction.

(15) Another laser light beam is incident from a position between the spectrum synthesis/decomposition part and the objective.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A scanning laser microscope which scans a sample with a laser light beam having at least one spectrum band through an objective using a scanning device, and which narrows a fluorescence from the sample within a desired spectrum range to perform an optical detection, said microscope comprising:
   a spectrum decomposition part configured to separate the laser light beam into a spectrum of the at least one spectrum band;
   a first optical system configured to condense the separated laser light beam;
   a second optical system configured to condense a light from the sample while collimating the laser light beam;
   a spectrum synthesis/decomposition part configured to separate the light from the sample into a spectrum while synthesizing the separated laser light beam;
   at least one reflector which is arranged substantially at a focus position of the first optical system and the second optical system, and which is configured to pass the laser light beam and reflect a part of the light from the sample; and
   an optical detector which detects the light reflected by a respective one said reflector.

2. The scanning laser microscope according to claim 1, wherein the reflector is adapted to reflect both a wavelength width and a wavelength band while adjusting the wavelength width and the wavelength band.

3. The scanning laser microscope according to claim 1, further comprising:
   a confocal lens optically connected with the second optical system and configured to condense the light, from the sample; and
   a confocal diaphragm arranged at a focus position of the confocal lens,
   wherein the confocal lens and confocal diaphragm are optically connected with a scanning device.

4. The scanning laser microscope according to claim 1, wherein the optical detector is arranged substantially at an optically conjugate position with respect to a position at which the light from the sample is incident to the spectrum synthesis/decomposition part.

5. The scanning laser microscope according to claim 1, further comprising a third optical system which is arranged between the reflector and the detection part and which collimates the light reflected by the reflector.

6. The scanning laser microscope according to claim 5, wherein the second optical system and the third optical system have the same configuration.

7. The scanning laser microscope according to claim 6, wherein the spectrum decomposition part and the spectrum synthesis/decomposition part have the same configuration.

8. The scanning laser microscope according to claim 1, wherein a detection optical path comprises:
   a third optical system which collimates the light reflected by the reflector;
   a synthesis part configured to synthesize a spectrum of the light collimated by said third optical system;

a confocal lens which condenses the light synthesized by the spectrum synthesis part;

a confocal diaphragm arranged at a focus position of the confocal lens; and the optical detector, which detects the light which passes the confocal diaphragm, and wherein one said detection optical path is optically connected with each said reflector.

9. The scanning laser microscope according to claim 8, wherein the second optical system and the third optical system have the same configuration.

10. The scanning laser microscope according to claim 8, wherein the spectrum decomposition part and the spectrum synthesis/decomposition part have the same configuration.

11. The scanning laser microscope according to claim 1, further comprising an intermediate magnification change part arranged between the spectrum synthesis/decomposition part and the objective.

12. The scanning laser microscope according to claim 11, wherein the intermediate magnification change part is adapted to be set to correspond to a pupil diameter of the used objective.

13. The scanning laser microscope according to claim 1, wherein the reflector acts as a shielding part and has a shape with a vertical angle, and the reflector has a first movement axis which substantially corresponds to a direction in which the laser light beam is separated into the spectrum by the spectrum decomposition part, and a second movement axis which is substantially normal to the first movement axis and which does not correspond to a direction of the laser light beam; and wherein a driving mechanism moves the reflector along the first movement axis and the second movement axis.

14. The scanning laser microscope according to claim 1, wherein a reflection surface of the reflector has two ridge lines with a vertical angle not normal to a direction in which the laser light beam is separated into the spectrum by spectrum decomposition part, and wherein a cutoff member which intercepts light diffracted by the reflector is arranged on optical path from the reflector.

15. The scanning laser microscope according to claim 1, wherein the first optical system and the second optical system each comprise a spherical or parabolic mirror.

16. The scanning laser microscope according to claim 1, further comprising a single mode fiber which is arranged between the spectrum synthesis/decomposition part and the scanning device so as to lead the laser light beam to the objective.

17. The scanning laser microscope according to claim 1, wherein another laser light beam is incident onto a position between the spectrum synthesis/decomposition part and the objective.

18. A scanning laser microscope which scans a sample with a laser light beam having at least one spectrum band through an objective using a scanning device, and which narrows a fluorescence from the sample within a desired spectrum range to perform an optical detection, said microscope comprising:

a spectrum decomposition part configured to separate the laser light beam into a spectrum of the at least one spectrum band;

a first optical system configured to condense the separated laser light beam;

at least one reflector which is arranged substantially at a focus position of the first optical system, which is configured to reflect the separated laser light beam at least partially and to pass light from the sample, and which is adapted to adjust a wavelength width and a wavelength band of the light from the sample;

a second optical system configured to substantially condense the light from the sample while collimating the laser light beam reflected by the reflector; and an optical detector which detects the light which passes the reflector.

19. The scanning laser microscope according to claim 18, further comprising:

a confocal lens optically connected with the second optical system and configured to condense the light from the sample; and a confocal diaphragm arranged at a focus position of the confocal lens, wherein the confocal lens and confocal diaphragm are optically connected with a scanning device.

20. The scanning laser microscope according to claim 18, wherein the optical detector is arranged substantially at an optically conjugate position with respect to a position at which the light from the sample is incident to the spectrum synthesis/decomposition part.

21. The scanning laser microscope according to claim 18, further comprising a third optical system which is arranged between the reflector and the detection part and which collimates the light reflected by the reflector.

22. The scanning laser microscope according to claim 21, wherein the second optical system and the third optical system have the same configuration.

23. The scanning laser microscope according to claim 22, wherein the spectrum decomposition part and the spectrum synthesis/decomposition part have the same configuration.

24. The scanning laser microscope according to claim 18, wherein a detection optical path comprises:

a third optical system which collimates the light reflected by the reflector;

a synthesis part configured to synthesize a spectrum of the light collimated by said third optical system;

a confocal lens which condenses the light synthesized by the spectrum synthesis part;

a confocal diaphragm arranged at a focus position of the confocal lens; and the optical detector, which detects the light which passes the confocal diaphragm, and wherein one said detection optical path is optically connected with each said reflector.

25. The scanning laser microscope according to claim 24, wherein the second optical system and the third optical system have the same configuration.

26. The scanning laser microscope according to claim 25, wherein the spectrum decomposition part and the spectrum synthesis/decomposition part have the same configuration.

27. The scanning laser microscope according to claim 18, further comprising an intermediate magnification change part arranged between the spectrum synthesis/decomposition part and the objective.

28. The scanning laser microscope according to claim 27, wherein the intermediate magnification change part is adapted to be set to correspond to a pupil diameter of the used objective.

29. The scanning laser microscope according to claim 18, wherein the reflector acts as a shielding part and has a shape with a vertical angle, and the reflector has a first movement axis which substantially corresponds to a direction in which the laser light beam is separated into the spectrum by the spectrum decomposition part, and a second movement axis which is substantially normal to the first movement axis and which does not correspond to a direction of the laser light beam; and wherein a driving mechanism moves the reflector along the first movement axis and the second movement axis.

30. The scanning laser microscope according to claim 18, wherein a reflection surface of the reflector has two ridge lines with a vertical angle not normal to a direction in which the laser light beam is separated into the spectrum by the spectrum decomposition part.

31. The scanning laser microscope according to claim 18, wherein the first optical system and the second optical system each comprise a spherical or parabolic mirror.

32. The scanning laser microscope according to claim 18, further comprising a single mode fiber which is arranged between the spectrum synthesis/decomposition part and the scanning device so as to lead the laser light beam to the objective.

33. The scanning laser microscope according to claim 18, further comprising at least one deflector which is adapted to reflect the light which passes the reflector so as to deflect a traveling direction of the light.

34. The scanning laser microscope according to claim 33, wherein the deflector comprises a triangular mirror which is movable along a first direction which substantially corresponds to a spectrum decomposition direction in which the laser light beam is separated into the spectrum by the spectrum decomposition part and a second direction which is substantially normal to the direction.

35. The scanning laser microscope according to claim 1, wherein the second optical system is arranged between the reflector and the detection part and collimates the light reflected by the reflector.

36. The scanning laser microscope according to claim 1, wherein the second optical system collimates the light reflected by the reflector, and a detection optical path comprises:

a synthesis part configured to synthesize a spectrum of the light collimated by said second optical system;

a confocal lens which condenses the light synthesized by the spectrum synthesis part;

a confocal diaphragm arranged at a focus position of the confocal lens; and the optical detector, which detects the light which passes the confocal diaphragm, and wherein one said detection optical path is optically connected with each said reflector.

37. The scanning laser microscope according to claim 22, wherein the spectrum decomposition part and the spectrum synthesis/decomposition part are integrally formed as a single part.

* * * * *